(12) United States Patent
Akedo et al.

(10) Patent No.: US 8,411,343 B2
(45) Date of Patent: *Apr. 2, 2013

(54) OPTICAL SCANNING DEVICE

(75) Inventors: Jun Akedo, Tsukuba (JP); Jaehyuk Park, Tsukuba (JP)

(73) Assignee: National Institute of Advanced Industrial Science and Technology (JP)

( * ) Notice: Subject to any disclaimer, the term of this patent is extended or adjusted under 35 U.S.C. 154(b) by 328 days.

This patent is subject to a terminal disclaimer.

(21) Appl. No.: 12/443,023

(22) PCT Filed: Sep. 26, 2007

(86) PCT No.: PCT/JP2007/068636
§ 371 (c)(1),
(2), (4) Date: Mar. 26, 2009

(87) PCT Pub. No.: WO2008/038649
PCT Pub. Date: Apr. 3, 2008

(65) Prior Publication Data
US 2010/0079837 A1   Apr. 1, 2010

(30) Foreign Application Priority Data
Sep. 27, 2006   (JP) .................................. 2006-261604

(51) Int. Cl.
*G02B 26/08* (2006.01)
(52) U.S. Cl. ..................................................... 359/224.1
(58) Field of Classification Search ............... 359/199.1, 359/212.1, 213.1, 214.1, 221.2–221.4, 224.1, 359/199.2–199.4, 200.6–200.8
See application file for complete search history.

(56) References Cited

U.S. PATENT DOCUMENTS

| | | | |
|---|---|---|---|
| 2,920,529 A | 1/1960 | Blythe | |
| 5,245,463 A | 9/1993 | Goto | |
| 5,543,956 A | 8/1996 | Nakagawa et al. | |
| 5,745,278 A | 4/1998 | La Fiandra | 359/224 |
| 5,828,051 A | 10/1998 | Goto | 235/467 |
| 6,198,565 B1 | 3/2001 | Iseki et al. | 359/224 |

(Continued)

FOREIGN PATENT DOCUMENTS

| | | |
|---|---|---|
| JP | 6-175060 A | 6/1994 |
| JP | H07-065098 | 3/1995 |

(Continued)

OTHER PUBLICATIONS

International Search Report dated Dec. 18, 2007, issued in corresponding international application No. PCT/JP2007/068636.

(Continued)

*Primary Examiner* — Frank Font
(74) *Attorney, Agent, or Firm* — Ostrolenk Faber LLP

(57) ABSTRACT

An optical scanning device of the invention includes: a substrate; torsion bar portion which is connected to the substrate; a mirror portion which is supported by the torsion bar portion; a drive source which causes the substrate to oscillate; and a light source which projects light onto the mirror portion, where the mirror portion resonates and vibrates in accordance with a vibration imparted to the substrate by the drive source, and the direction of reflection light from the light projected onto the mirror portion from the light source changes in accordance with the vibration of the mirror portion, and a spring constant in a longitudinal direction of the torsion bar portion supporting the mirror portion is distributed along the longitudinal direction of the torsion bar portion.

3 Claims, 20 Drawing Sheets

U.S. PATENT DOCUMENTS

| | | | |
|---|---|---|---|
| 6,297,898 B1 * | 10/2001 | Tanijiri et al. | 359/224.1 |
| 6,676,020 B2 | 1/2004 | Grant et al. | 235/462.45 |
| 6,729,545 B2 | 5/2004 | Li et al. | 235/462.43 |
| 6,989,919 B2 | 1/2006 | Yasui | 359/224 |
| 7,031,041 B2 * | 4/2006 | Mi et al. | 359/224.1 |
| 7,038,826 B2 * | 5/2006 | Yasuda | 359/224.1 |
| 7,146,067 B2 | 12/2006 | Despont et al. | 385/16 |
| 7,161,275 B2 | 1/2007 | Yoda | 310/309 |
| 7,262,541 B2 * | 8/2007 | Xiaoyu et al. | 310/309 |
| 7,394,583 B2 * | 7/2008 | Akedo et al. | 359/223.1 |
| 7,593,029 B2 * | 9/2009 | Satoh et al. | 347/243 |
| 7,605,966 B2 | 10/2009 | Tani et al. | 359/224.1 |
| 7,916,373 B2 * | 3/2011 | Klemens et al. | 359/199.4 |
| 2005/0078169 A1 * | 4/2005 | Tumer | 347/260 |
| 2005/0128552 A1 | 6/2005 | Yasuda et al. | |
| 2005/0254111 A1 | 11/2005 | Griffith et al. | 359/224 |
| 2006/0245023 A1 * | 11/2006 | Akedo et al. | 359/223 |
| 2007/0064293 A1 * | 3/2007 | Turner et al. | 359/224 |
| 2007/0171500 A1 | 7/2007 | Jeong et al. | 359/224 |

FOREIGN PATENT DOCUMENTS

| | | |
|---|---|---|
| JP | 09-197334 | 7/1997 |
| JP | H10-104543 | 4/1998 |
| JP | H10-197819 | 7/1998 |
| JP | 2000-292735 A | 10/2000 |
| JP | 2001-004952 | 1/2001 |
| JP | 2004-258158 | 9/2004 |
| JP | 2005-181394 A | 7/2005 |
| JP | 2006-293116 | 10/2006 |
| WO | WO 2004/017119 A1 | 2/2004 |

OTHER PUBLICATIONS

Park et al., "Practical High-Speed Metal-Based Optical Microscanning Devices with Low Production Cost", *Micro Electro Mechanical Systems 2006*, Istanbul, Turkey, Jan. 22-26, 2006, pp. 730-733.

International Search Report issued in PCT/JP2007/068674 with English translation dated Dec. 25, 2007.

Notice of Allowance dated Apr. 22, 2008 issued in related U.S. Appl. No. 11/258,103.

Office Action dated Jun. 25, 2007 issued in related U.S. Appl. No. 11/258,103.

Office Action dated Sep. 28, 2007 issued in related U.S. Appl. No. 11/258,103.

Office Action dated Jun. 29, 2011 issued in related U.S. Appl. No. 12/443,221.

* cited by examiner a TORSIONAL RESONANCE OF MIRROR PORTION (fm)
b DIVIDED RESONANCE VIBRATION OF FRAME PORTION (fb)

SUBSTANTIAL LENGTH OF TORSION
BAR PORTIONS (mm)

SUBSTANTIAL LENGTH OF TORSION
BAR PORTIONS (mm)

LENGTH BETWEEN BOTH ENDS
OF TORSION BAR PORTIONS (mm)

OPTICAL SCANNING DEVICE

CROSS REFERENCE TO RELATED APPLICATIONS

The present application is a 35 U.S.C.§371 National Phase conversion of PCT/JP2007/068636, filed Sep. 26, 2007, which claims benefit of Japanese Application No. 2006-261604, filed Sep. 27, 2006, the disclosure of which is incorporated herein by reference. The PCT International Application was published in the Japanese language.

BACKGROUND OF THE INVENTION

1. Field of the Invention

The present invention relates to an optical scanner which performs scans by the scanning of an optical beam, and, in particular, to an optical scanning device having a structure in which a micro mirror which is supported by torsion bars is made to oscillate so as to cause the direction of an optical beam to change.

2. Background Art

In recent years, optical scanners which scan optical beams of laser light or the like have been used as optical instruments such as bar code readers, laser printers, and head mounted displays, or as the optical intake devices of input devices such as infrared cameras and the like. Optical scanners having a structure in which a micro mirror obtained via silicon micromachining technology is oscillated have been proposed for this type of optical scanner. For example, the structure described in Japanese Unexamined Patent Application, First Publication No. H07-65098 (Patent document 1) is known (referred to below as 'Conventional technology 1'). As shown in FIG. 19, this optical scanner irradiates light which is emitted from a light source 100 and reflected by a mirror portion 101 onto a detection object 102, and then vibrates the mirror portion 101 so that the light is scanned in a predetermined direction of the detection object 102, and is provided with two mutually parallel drive sources 103 which are formed as cantilevered beams with one end respectively thereof formed as a fixed end and which perform bending operations, a linking component 104 which links together the free end sides of the two drive sources 103, a torsional deformation component 105 which extends from a center portion of the linking component 104, and the mirror portion 101 which is provided on this torsional deformation component 105. The center of gravity of the mirror portion 101 is made to sit on the torsion center axis of the torsional deformation component 105. If the two drive sources 103 are driven, for example, by a bimorph structure on which a piezoelectric material has been adhered, and are vibrated in antiphase, then torsional vibration is induced in the torsional deformation component 105, and the two drive sources are driven at the resonance frequency of the torsional deformation component 105. As a result, it is possible to vibrate the mirror portion 101 over a sizable amplitude.

Moreover, as shown in FIG. 20, the optical scanner described in Japanese Unexamined Patent Application, First Publication No. H04-95917 (Patent document 2, referred to below as 'Conventional technology 2') is a scanner in which a mirror surface 111 is formed by a surface of a vibrator 110 having two elastic deformation modes, namely, a bending deformation mode and a torsional deformation mode, and in which this vibrator 110 is vibrated at the respective resonance frequencies of the two modes. Optical beams irradiated towards the mirror surface 111 of the vibrator 110 are reflected by that mirror surface 111 so that the light is scanned in two directions. If the vibrator 110 is vibrated in a single mode, then this scanner becomes a one-dimensional scanning optical scanner.

Moreover, as an optical scanner in which a micro mirror obtained by means of silicon micromachining technology is oscillated, the structure described in Japanese Unexamined Patent Application, First Publication No. H10-197819 (Patent document 3) is known (referred to below as 'Conventional technology 3').

As shown in FIG. 21, this optical scanner is provided with a plate-shaped micro mirror 121 which is used to reflect light, a pair of rotation supporting bodies 122 which are positioned on a straight line and support both sides of the micro mirror 121, a frame portion 123 to which the pair of rotation supporting bodies 122 are connected and which surrounds the periphery of the mirror 121, and a piezoelectric element 124 which applies translational motion to the frame portion 123. In addition, this optical scanner is structured such that the center of gravity of the mirror 121 is located at a position away from the straight line connecting together the pair of rotation supporting bodies 122.

When voltage is applied to the piezoelectric element 124, the piezoelectric element 124 is made to expand and contract, so as to vibrate in the Z axial direction. This vibration is transmitted to the frame portion 123. When the micro mirror 121 is made to move relative to the driven frame portion 123 and the vibration component in the Z axial direction is transmitted to the micro mirror 121, because the micro mirror 121 has a left-right asymmetrical mass component relative to the axis formed by the X axis rotation supporting bodies 122, rotational moment is generated in the micro mirror 121 centered on the X axis rotation supporting bodies 122. In this manner, the translational motion which has been applied to the frame portion 123 by the piezoelectric element 124 is transformed into rotational motion centering on the X axis rotation supporting bodies 122 of the micro mirror 121.

Moreover, as shown in FIG. 22, an optical scanning device is also described in Japanese Unexamined Patent Application, First Publication No. H10-104543 (Patent document 4, referred to below as 'Conventional technology 4'). In this optical scanning device, beam portions 133 and 133 extend in mutually opposite directions from both sides of a movable portion 132 in a vibrator 131, and are connected to two arm portions 134 and 134 of a fixed portion 136. Piezoelectric thin films 135 and 135 are provided respectively on the arm portions 134 and 134 of the fixed portion 136, and these piezoelectric thin films 135 and 135 are driven by the same signal which includes higher order vibration frequencies.

In the optical scanning devices of the above-described prior technologies, in order to achieve a small-size, portable laser projector or the like, it is necessary to position the above-described optical scanning device in a compact arrangement together with a laser light source and other optical systems, so that it is essential that such apparatuses are designed to be as small as possible. In order to achieve this, it is possible to miniaturize the optical scanning device using Si micro machining and the like, however, in contrast, in the case of a laser projector system which performs a single mirror scan, because the optical aperture width is determined by the size of the mirror, if this optical aperture width is too small, then it is not possible to achieve a sufficiently small spot size on the projection surface. As a result, there is a considerable deterioration in image resolution. Because of this, it is necessary for the size of the mirror to be greater than or equal to at least 1 mmφ, and depending on the application, a surface whose area is greater than or equal to 5 mm square is considered necessary. In this case, because the length of the hinge which supports the mirror portion is added to the mirror size, the size of those structural portions of the optical scanning device which generate torsional resonance ends up being greater than or equal to at least 5 mm square, and in some cases, greater than or equal to 1 cm which hinders attempts to make the size of the device any smaller. This is a serious problem as it makes it difficult for the scan angle of the optical scanning device to be made greater than or equal to 30°, and in the case of a low-scanning speed optical scanning device having a resonance frequency that is less than or equal to 100 Hz which is used for the vertical scanning of a two-dimensional scan, makes it difficult for the design to be made more compact (referred to below as Problem 1).

Moreover, in the design of an optical scanning device having a resonance frequency that is greater than or equal to 10 kHz in which the length of the torsion hinge is comparatively short, when this is made to resonate by a large driving force and the mirror portion is scanned using a large torsion angle that is greater than or equal to 20°, because the torsion angle of the torsion bars per unit length increases considerably, if the torsion bars are made from a metal material or the like, the problem has occurred that because of metal fatigue there is an abrupt deterioration in performance. Moreover, when the torsion bars are made from a brittle material such as silicon monocrystals, in order to achieve a large scan angle, there is a limit in the torsion angle per unit length. Because of this, it is necessary to design the hinge length to be comparatively long, and reducing the size of the mirror resonance structural portions and of the overall optical scanning device continues to remain a difficult design problem (referred to below as Problem 2).

If, for example, the spring constant of the elastic deformation portion (i.e., the torsion bar portions) in Conventional technology 1 is taken as k, and the moment around the rotation axis (i.e., the Y axis or the Z axis) is taken as I, then the resonance frequency f in a vibrator 1 can be expressed by the following formula.

$$f = \frac{1}{2\pi}\sqrt{\frac{k}{I}} \quad (1)$$

The spring constant in the bending deformation mode (in a θB direction) of the elastic deformation portion is taken as kB, while the spring constant in the torsion deformation mode (in a θT direction) is taken as kT. If the spring constant k in Formula (1) is replaced by these spring constants kB and kT, then Formula (1) shows the resonance frequency fB in the bending deformation mode, and shows the resonance frequency fT in the torsion deformation mode, and the spring constant kB in the bending deformation mode is expressed by the following formula.

$$K_B = \frac{Ewt^3}{4L} \quad (2)$$

Here, E is Young's modulus, w is the width (i.e., the Length in the Y (direction) or the elastic deformation potion, t is the thickness (i.e., the length in the X direction) of the elastic deformation portion, and L is the length (i.e., the length in the Z direction) of the elastic deformation potion.

The spring constant kT in the torsion deformation mode is expressed by the following formula.

$$K_T = \frac{G\beta wt^3}{12L}(t < w) \quad (3)$$

Here, G is the modulus of transverse elasticity, and β is a coefficient relating to the shape of the cross section. In Formula (3), more typically, w represents the length of a long side of the cross section of the elastic deformation portion, and t represents the length of a short side of the same cross section.

It is understood from Formula (1) that, as a result of the spring constant k changing, the resonance frequency of the vibrator is changed.

Moreover, in actual devices in which the above-described optical scanning devices are used such as laser projectors and barcode readers, because of the necessity for two-dimensional scans or in order to obtain a reduction in size, it is necessary not only to reduce the size of the optical scanning device itself, but to additionally create designs in which various combinations of reflection mirrors and the like are used in order to modify the optical path. However, each time light is reflected onto one of the respective minor portions, the overall light amount is decreased by the absorptivity of that mirror portion, and there is a deterioration in the projected image and in the luminance of the optical beams. In particular, when the optical scanning device is used in a portable device, increasing the amount of light from the light source, and consequently, securing sufficient voltage source capacity have proven to be sizable problems (referred to below as Problem 3).

Moreover, the optical scanning device of the above-described Conventional technology 4 has the drawback that a large torsion angle cannot be formed in the movable portion 132.

Namely, if a piezoelectric film is formed in the two narrow-width cantilever beam portions which support the two torsion bars protruding from the frame portion, then the rigidity of this portion increases and vibration which is induced in the piezoelectric film is not transmitted efficiently to the torsion bars. As a result, the torsional vibration of the mirror becomes smaller. Moreover, unless the vibration characteristics of the vibration source portion formed by the two cantilever beam portions and the piezoelectric film which is formed thereon are matched precisely, then the vibration amplitude of the torsional vibration of the mirror becomes suppressed and, at the same time as this, a vibration mode other than torsional vibration is superimposed thereon so that accurate laser beam scanning cannot be achieved. Furthermore, in order to increase the drive force for the mirror by increasing the surface area of the piezoelectric film portion, it is necessary to increase the width of the cantilever beam portions. Because of this, an unnecessary two-dimensional vibration mode is generated in the same cantilever beam portion, so that at the same time as the vibration amplitude of the torsional vibration of the mirror is restricted, a vibration mode other than the torsional vibration is superimposed thereon. As a result, the problem arises that it is not possible to achieve accurate laser beam scanning. Moreover, because the width of the cantilever beams is restricted to a narrow width, the formation of the top portion electrodes which are used to drive the piezoelectric film formed on this portion is made more difficult because of the narrow width, so that problems arise such as the yield during production being greatly affected (referred to below as Problem 4).

FIG. 23 shows the same case as that of Conventional technology 4, and shows a structure in which a piezoelectric film is formed on two narrow-width cantilever beam portions which support two torsion bars which protrude from a frame portion. The drive efficiency of the mirror portion scan angle was checked by a simulation calculation. The surface where Y=0was taken as a plane of symmetry, and half of this was used as a model.

FIG. 24 shows the torsion angle of a mirror having a structure in which a piezoelectric film is formed on two narrow-width cantilever beam portions which support two torsion bars which protrude from the frame portion shown in FIG. 23. The drive voltage was set at 1 V, while the characteristics of a PZT-5A which are typical parameters were used for the electrical characteristics of the piezoelectric body, while SUS 304 characteristics were used for the material of the scanner frame main body. The torsion angle of the mirror portion was small at only 0.63°.

SUMMARY OF THE INVENTION

It is an object of the invention to provide an optical scanning device in which it is possible to reduce the overall size of an optical scanning device while securing sufficient mirror size.

It is a further object of the invention to provide an optical scanning device in which torsional vibration can be generated efficiently in a mirror portion.

A description will now be given of the basic elements of the optical scanning device of the invention which is intended to achieve the above-described objects with reference made to the drawings.

Firstly, the basic structure of the optical scanning device which is the subject of the invention is shown in FIG. 1.

In FIG. 1, for example, by etching or by press working a plate material, a substrate 10 is cut out so as to leave a mirror portion 11 and torsion bar portions 12 remaining. The mirror portion 11 is supported from both sides by the torsion bar portions 12 and 12 which are joined to the substrate 10. Outer side ends of the torsion bar portions 12 and 12 are supported respectively by cantilever beam portions 14.

In addition, one end of the substrate 10 is supported in a cantilever form, for example, by a supporting component 13.

In the present specification, the term 'substrate 10' refers to a frame structural portion of a device which excludes the mirror portion 11 and the torsion bar portions 12, but includes the cantilever beam portions 14 (hereinafter, the substrate 10 may be referred to as a frame structural portion). The portion of the substrate 10 which excludes the cantilever beam portions 14 is referred to as the substrate main body 20.

A piezoelectric film 15 which is used to drive an optical scan is formed on a portion of the substrate 10 away from the linking portion between the substrate 10 and torsion bar portions 12. This piezoelectric film 15 is formed using a thin-film formation method such as an aerosol deposition method (may be referred to below on occasion as an 'AD method'), a sputtering method, or a sol-gel method, or may be formed by adhering a bulk piezoelectric thin plate material thereon. When voltage is applied from a power source 16 to a top portion electrode 17 on the optical scan driving piezoelectric film 15 and to the substrate 10 which serves as a bottom portion electrode, the optical scan driving piezoelectric film 15 vibrates in piezoelectric oscillation, and a plate wave or vibration is induced in the substrate 10. Using this, torsional vibration is generated in the mirror portion 11. As a result, it is possible to generate torsional vibration efficiently in the mirror portion 11 using a simple structure.

In this case, the optical scan driving piezoelectric film 15 forms a drive source to cause the substrate 10 to vibrate.

If optical beams are irradiated from a light source 18 onto the mirror portion 11 while voltage is being applied to the optical scan driving piezoelectric film 15 which serves as a drive source, then because the mirror portion 11 vibrates, light which is reflected by the mirror portion 11 vibrates at a uniform torsion angle.

In the basic structure of the optical scanning device which is the subject of the invention shown in FIG. 1, firstly, in order to solve the above-described Problem 1, as shown in Part (b) of FIG. 2, according to the invention, either the mirror portion 11 is extended so as to surround the torsion bar portions 12, or notches which are parallel with the axial direction of the torsion bar portions 12 are cut into the inner sides of the mirror portion 11 so that the torsion bar portions 12 are extended as far as the inner sides of the mirror portion 11. As a result, essentially, without changing the overall length of the mirror portion 11 and torsion bar portions 12, the mirror size is enlarged. At this time, there is a loss in the amount of reflection light corresponding to the surface area of the notches which separate the mirror portion 11 from the torsion bar portions 12, however, the width of these notches only needs to be enough for them to not be connected mechanically, and it is easy to reduce the surface area of these portions compared with the entire mirror surface area, and the reduced light amount does not pose any problems. For example, if this surface area is set less than or equal to 10% of the diameter of the light spot projected onto the mirror surface, then the loss in the amount of light can be essentially disregarded. PART (a) of FIG. 2 shows a conventional device.

Moreover, in order to solve Problem 2, as shown in FIG. 3, in the invention, by distributing the spring constant in the axial direction of the torsion bar portions 12 which support the mirror portion 11, namely, by changing the spring constant in the longitudinal direction, compared with when there is no distribution in the spring constant of the torsion bar portions 12, it is possible for the length of the torsion bar portions 12 to be designed shorter in both the resonance frequency and the scan angle.

In the present specification, any change in the spring constant which is due to the shape of the torsion bar portions being changed is included as being a change in the spring constant of the torsion bar portions.

Moreover, in order to solve Problem 3, as shown in FIG. 4, in the invention, the torsion bar portions 12 which support the mirror portion 11 are formed from a metal material such as stainless steel or from a plastically deformable material such as a resin material. By causing these torsion bar portions 12 to become plastically deformed so that the mirror portion 11 is fixed on an angle relative to the substrate 10 supporting the torsion bar portions 12, then an optical beam is incident onto the mirror portion 11 without using reflective mirrors, it is possible to impart a deflection angle to the scanning optical beam. As a result, structurally, the above-described optical scanning device can be designed with a smaller size.

Moreover, in order to solve Problem 4, by forming a single piezoelectric film (i.e., body) as a vibration source in the frame portion, the rigidity of the two cantilever beam portions is lowered and mirror torsional vibration is efficiently induced. At the same time as this, by only providing a single vibration source to drive the mirror, the invention solves the above-described problem of the creation of an unnecessary vibration mode as well as the problem of a consequent reduction in amplitude which are caused by a lack of uniformity in the vibration source. Moreover, by separating the piezoelectric film formation portion which forms the vibration source from the mirror torsional vibration portions which are formed by the mirror portion and the torsion bar portions which support the mirror portion by means of the two cantilever beam portions, the surface area of the piezoelectric film forming the drive source can be set freely irrespective of the width of the cantilever beam portions, and it becomes possible to apply a large drive force more efficiently to the mirror torsional vibration portions. Furthermore, it is also easy to form the electrodes for driving the piezoelectric film, so that it becomes possible to improve the yield in industrial production.

FIG. 5 is a plan view showing an optical scanning apparatus according to the invention which is structured such that one piezoelectric film 15 forming the drive source is provided on the substrate 10, wherein the surface where Y=0 is taken as a plane of symmetry, and only half of this is used as a model.

The dimensions of the mirror portion 11 and the dimensions of the torsion bar portions 12, the mounting position where the torsion bar portions 12 are mounted on the mirror portion 11 (i.e., the position of the center of gravity of the mirror portion 11), the shape of the substrate 10 as well as the method which is used to support it, and also the thickness and the value of the total surface area of the piezoelectric film 15 which all provide the basic structure of the optical scanning apparatus are made the same. This optical scanning apparatus only differs in the position where the piezoelectric film 15 is formed.

FIG. 6 shows the torsion angle of the mirror portion 11 of the device shown in FIG. 5. The drive voltage was set at 1 V, while the characteristics of a PZT-5A which are typical parameters were used for the electrical characteristics of the piezoelectric body, while SUS 304 characteristics were used for the material of the scanner frame main body. Basically, the resonance frequency of the invention shown in FIG. 5 is substantially the same as in Conventional technology 4 shown in FIG. 16, however, while the torsion angle of the mirror portion 11 was only 0.63° in Conventional technology 4, in the structure of the invention shown in FIG. 5, it was confirmed to have an approximately 4.3 times greater torsion, namely, the torsion angle was 2.69° (80.7° at a conversion of 30V).

It is also possible to position a plurality of vibration sources on a substrate in order to increase the mirror scanning amplitude, however, in this case, because of irregularities in the mounting state due to the characteristics of the vibration sources or the mounting positions, or to the adhesion or film formation, it becomes easy for two-dimensional vibration which is asymmetrical relative to the axis of symmetry in a perpendicular direction relative to the torsion bars supporting the mirror portion to be induced in the substrate, which results in a deterioration in the scanning accuracy of the optical beams due to the torsional vibration of the mirror portion. In contrast, in the invention, torsional vibration is induced efficiently in the minor portion even though there is only one vibration source, and it is possible to largely reduce scan jitter in the optical beams, and suppress product irregularities.

As shown in FIG. 1 of the invention, in order to transmit vibration energy generated at a position separated from the mirror portion 11 as energy which efficiently becomes torsional vibration in the minor portion 11, it is necessary to considerably set the resonance frequency (fm) of the mirror portion 11 which is mainly determined by the mass of the mirror portion 11 and by the spring constant of the torsion bars 12 away from the resonance frequency (fb) which includes the division oscillation mode of the frame portion itself. When the piezoelectric film 15 of the optical scanning device is driven so as to match the resonance frequency (fm) of the torsional vibration of the mirror portion 11, then if a resonance mode is also induced in the substrate 10, the vibration energy generated by the vibration source becomes distributed between torsional vibration of the mirror portion 11 and two-dimensional division vibration of the substrate 10 due to the law of conservation of energy. Accordingly, the amplitude (i.e., the torsion angle) of the torsional vibration of the mirror portion 11 becomes smaller by the amount of vibration energy from the drive source which is consumed by the two-dimensional division vibration of the substrate 10, so that it becomes impossible to efficiently drive the optical scanning device. Moreover, if unnecessary two-dimensional division vibration is induced in the substrate 10, then there are also cases in which a vibration mode other than pure torsional vibration which has the torsional bar portions 12 as its axis of rotation becomes superimposed on the mirror portion 11 that positions at the distal end of the substrate 10, so that it becomes impossible to achieve an optical scan having a high level of accuracy in the rectilinear scan performance thereof. In contrast, as shown in FIG. 7, the invention is designed such that the torsional resonance frequency a (fm (n): n=0, 1, 2, . . . ) which includes elements up to the higher orders induced in the mirror portion does not overlap with the torsional resonance frequency b (fb (n): n=0, 1, 2, . . . ) which includes elements up to the higher orders induced in the substrate 10.

The optical scanning device of the invention has a basic structure in which the thin plate-shaped substrate 10 shown in FIG. 1 is cantilever supported by a supporting component 13 on the opposite side from the mirror portion 11. Because of this, if a vertical disturbance vibration is applied to the entire optical scanning device, then the entire optical scanning device vibrates, and optical beams which are reflected and scanned by the mirror portion 11 are affected by this vibration and do not vibrate stably, so that the problem arises that it is not possible to guarantee an accurate optical scan. Accordingly, assuming that the optical scanning device will be used in practical applications such as in portable devices and the like, it is necessary to improve this instability which is caused by this entire optical scanning device being supported by a cantilever structure.

Therefore, as shown in FIG. 8, in the invention, the optical scanning device is fixed by means of narrow-width substrate connecting bars 23 to an extremely rigid substrate fixing frame 22 which is positioned so as to surround the entire cantilever supported optical scanning device at positions separated from the supported portion supported by the supporting component 13.

At this time, the resonance state of the optical scanning device itself changes depending on the fixing positions of the substrate connecting bars 23, and is affected by the scan angle and resonance frequency of the mirror portion 11.

FIGS. 9 and 10 show the results when this state was examined. As shown in PART (a) of FIG. 9., if the optical scanning device is fixed by the substrate connecting bars 23 at the base of cantilever beam portions 14 whose vibration amplitude close to the center of the vibration is large when the mirror portion 11 is in torsional resonance state, then the scanning amplitude of the mirror portion 11 is considerably reduced, namely, by approximately 17° compared to the scanning amplitude of approximately 55° which is obtained when the optical scanning device is not fixed. This is because if a large portion of the vibration amplitude is fixed at the outer peripheral portion of the optical scanning device so that this vibration is suppressed, then the vibration mode of the entire optical scanning device substrate 10 is changed, which results in it becoming impossible to efficiently transmit energy to the torsional vibration of the mirror portion 11.

In contrast, in the state shown in FIG. 10 in which the substrate connecting bars 23 are not connected, when the mirror portion 11 is in torsional resonance state, if, as shown in PART (d) of FIG. 9, the optical scanning device is connected and fixed by the substrate connecting bars 23 in a portion in the vicinity of a bottom point 25 where a vibration amplitude in the Z axial direction of the edge portion of the optical scanning device substrate 10 (i.e., a portion indicated by the symbol 24 in FIG. 10) is at the minimum, then the scanning amplitude of the mirror portion 11 becomes a slightly larger scanning amplitude, namely, approximately 55°, than when it is not fixed to the substrate fixing frame 22. In this case, because the vibration mode of the entire optical scanning device substrate 10 is not changed, it is possible to maintain a substantially equivalent resonance state compared with when the optical scanning device is not fixed, and any effects on the scanning amplitude of the mirror portion 11 of the optical scanning device substrate 10 from the substrate connecting bars 23 are kept to a minimum.

Accordingly, if the optical scanning device is fixed via the outer edge portion of the optical scanning device by means of the substrate connecting bars 23 at the bottom point of the vibration when the mirror is resonating, or at the point where the vibration amplitude is the smallest and which is also furthest away from the optical scanning apparatus supporting component 13, then it is possible to stably support the optical scanning device against any external disturbance vibration without attenuating the scanning amplitude of the mirror portion 11.

When the scan jitter and optical face tangle error (i.e., the stability of the beam scanning speed) of the optical beams in the above-described optical scanning device of the invention were evaluated by a MEMS scanner measurement system (ALT-9A44) manufactured by ALT Ltd., it was found that while scan jitter of a conventional silicon MEMS optical scanner (manufactured by Nippon Signal) was Jp-p: 0.2 to 0.3%, irrespective of the fact that the optical scanning device of the invention was formed from a metal material, the scan jitter at scan resonance frequencies of 6 kHz, 16 kHz, and 24 kHz was smaller by a factor of 10, namely, Jp-p: 0.06%. It was thus possible to achieve a high-accuracy optical beam scan which equated to conventional polygon mirror technology. Moreover, in conventional polygon mirror technology, the optical face tangle error is approximately Wp-p: 30 to 40 seconds, and it is necessary to apply correction using an f-Θ lens or the like and lower the value by a factor of 10. However, in the optical scanning device of the invention, the optical face tangle error is approximately Wp-p: 5 seconds which is a lower value by a factor of 10, so that it is possible to achieve a highly stable beam scanning speed without a correction lens system, so that reductions in both size and cost can be achieved easily. From the above-described measurement results, in the optical scanning device of the invention, it is evident that it is possible to obtain an excellent optical beam scanning accuracy which can be used in a laser printer and the like.

The invention provides the excellent effects described below.

(1) By distributing the spring constant over the longitudinal direction of the torsion bar portions that supports the mirror portion, it is possible to design a shorter length for the torsion bar portions in both the resonance frequency and scan angle compared with when there is no distribution of the spring constant of the torsion bar portions.

(2) By making the substantial length of the torsion bar portions supporting the mirror portion longer than the space between the mirror portion end surfaces at the two ends of the torsion bar portions and the substrate, it is possible to obtain a larger mirror size without changing the overall length of the mirror portion and torsion bar portions.

(3) By setting the mirror portion in a desired position by pivoting the mirror portion from its initial set position around the supporting axis of the torsion bar portions, and imparting plastic deformation to the torsion bar portions, then the mirror portion is fixed in position on an angle, an optical beam is incident onto the mirror portion without using reflective mirrors, it is possible to impart a deflection angle to the scanning optical beam. As a result, structurally, the above-described optical scanning device can be designed with a smaller size.

(4) By sizably setting the resonance frequency of the mirror portion which is determined by the mass of the mirror portion and by the spring constant of the torsion bars away from the resonance frequency of the substrate, it is possible to transmit vibration energy generated at a position separated from the mirror portion efficiently as energy which becomes torsional vibration in the mirror portion.

(5) By positioning a substrate fixing frame so as to surround the substrate main body and cantilever beam portions and then fixing it on the fixing end side of the substrate main body, and by connecting together the substrate main body and the substrate fixing frame by means of substrate connecting bars at a position away from the supporting component and also in the vicinity of the minimum amplitude of the substrate vibration, it is possible to stably support the optical scanning device against external disturbance vibration without attenuating the scanning amplitude of the mirror portion.

DESCRIPTION OF THE PREFERRED EMBODIMENTS

The best embodiments for implementing the optical scanning device according to the invention will now be described based on examples with reference made to the drawings.

EXAMPLE 1

Figure 1:
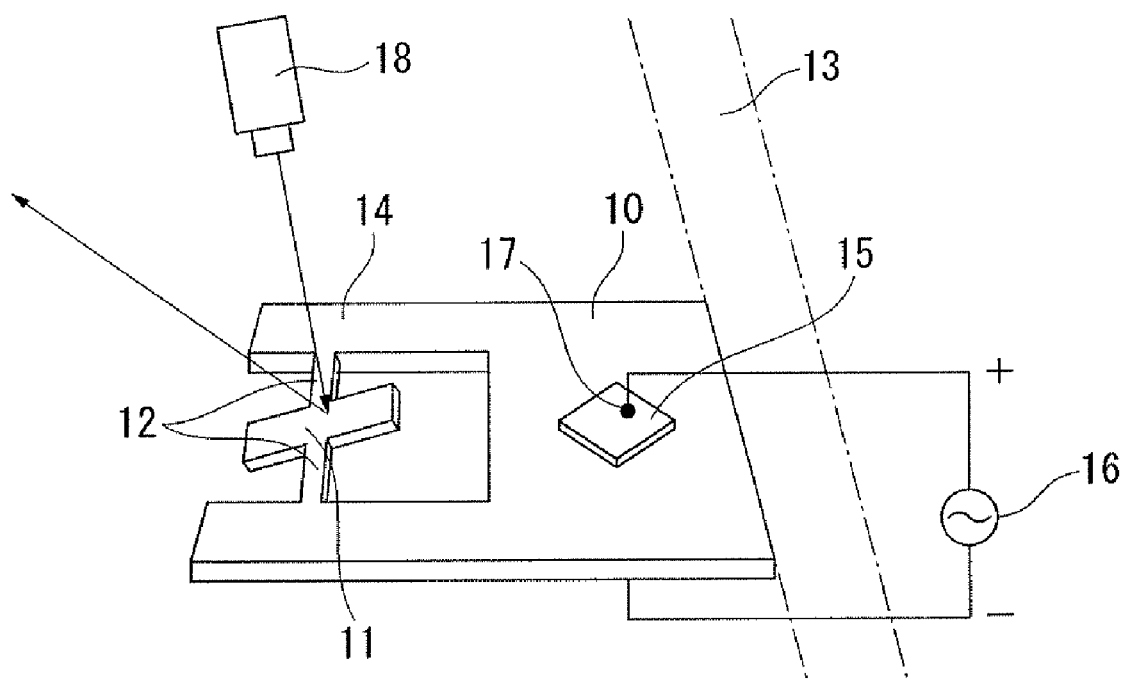
FIG. 1 is a perspective view showing the basic structure of the optical scanning device which is the subject of the invention.
Figure 2:
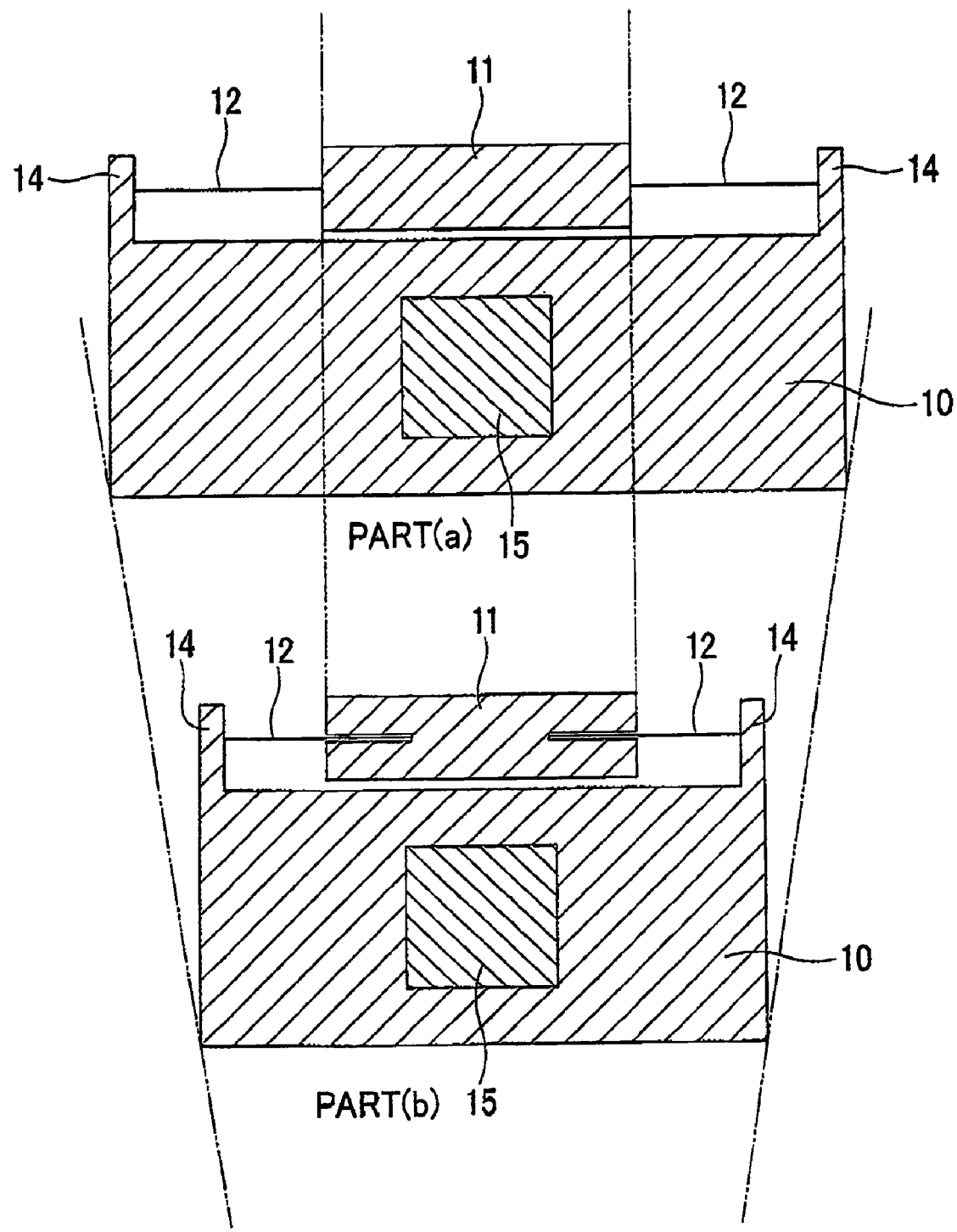
FIG. 2 is a plan view illustrating Example 1 according to the invention. PART (a) of FIG. 2 shows a conventional optical scanning device, while PART (b) of FIG. 2 shows the optical scanning device of Example 1.
Figure 3:
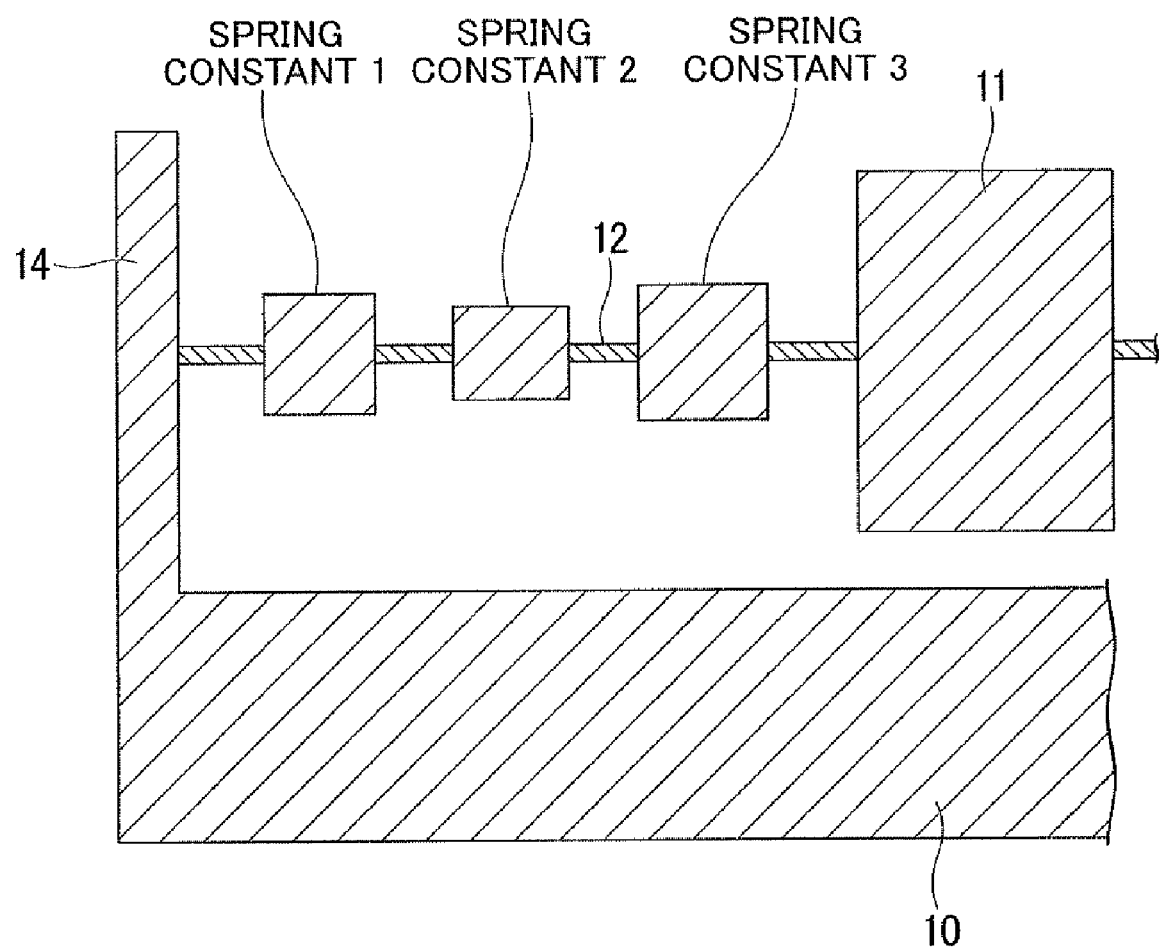
FIG. 3 is a schematic view illustrating a distribution of a spring constant in the axial direction of torsion bar portions supporting a mirror portion.

FIG. 2 is a plan view illustrating Example 1 according to the invention. PART (a) of FIG. 2 shows a conventional optical scanning device, while PART (b) of FIG. 2 shows the optical scanning device of Example 1. In FIG. 2, a supporting component which supports a substrate 10 and a power supply which supplies voltage to the optical scan driving piezoelectric film 15 have been omitted from the drawing.

In PART (b) of FIG. 2, by either extending the mirror portion 11 so as to surround the torsion bar portions 12, or by inserting notches which are parallel with the axial direction of the torsion bar portions 12 into the inner sides of the mirror portion 11, the torsion bar portions 12 are made to extend as far as the inner sides of the mirror portion 11, so that, essentially, without changing the size and resonance frequency of the mirror portion 11 from those shown in PART (a) of FIG. 2, the space between the mirror portion 11 and the substrate 10 can be shortened compared to that shown in PART (a) of FIG. 2. As a result, it is possible to reduce the overall size of the optical scanning device.

In experiments, substantially without altering the scan angle (100° and the torsion resonance frequency (500 to 600 Hz) of the mirror portion 11, as shown in FIG. 2, it is possible to shorten the length of the connection between the outer ends of the two torsion bar portions 12 and 12 which support the mirror portion 11 from both sides thereof from 16 mm to 12 mm, namely, by approximately 25%, which is effective in allowing the optical scanning device to be designed with a smaller size.

EXAMPLE 2

Figure 11:
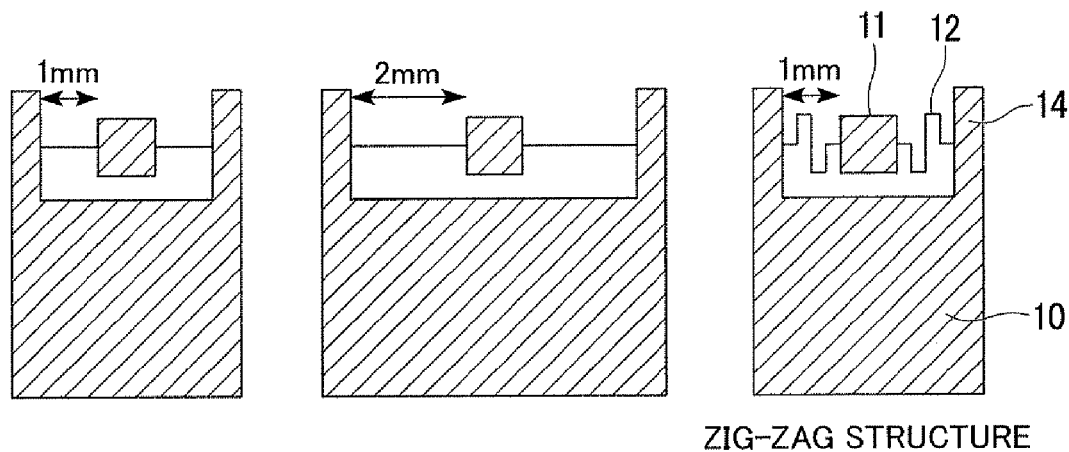
FIG. 11 is a plan view illustrating Example 2 according to the invention.
Figure 11:
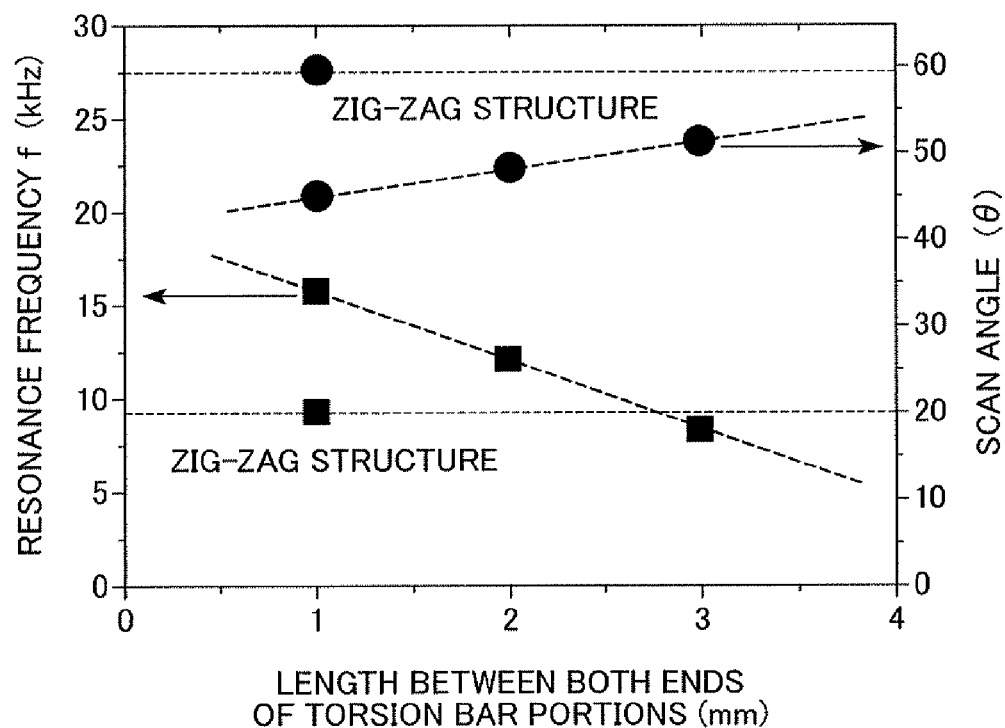

FIG. 11 is a plan view illustrating Example 2 according to the invention. In FIG. 11, a supporting component which supports a substrate 10, an optical scan driving piezoelectric film, and a power supply and the like have been omitted from the drawing.

FIG. 11 shows an example of a method of distributing the above-described spring constant in which, as shown in the top right portion of the drawing, a portion of the torsion bar portions 12 is formed as a resilient zig-zag structure, so that the length of the connection between the outer ends of the two torsion bar portions 12 and 12 can be designed shorter compared to the case shown in the top center of the drawing in which there is no distribution of the spring constant of the torsion bar portions 12 in both the resonance frequency and the scan angle.

In this case, if the length of a straight line connecting together the two ends of each torsion bar portion 12 is considered as being fixed, then as a result of the actual length of the torsion bar portions 12 themselves being extended, it is possible to lower the resonance frequency and, at the same time, increase the scan angle. Moreover, as shown in the graph in the bottom of FIG. 11, if the same resonance frequency is considered, then in this example the length of the straight line connecting together the two ends of each torsion bar portion 12 can be shortened by approximately ⅓, namely, from 3 mm to 1 mm (see the symbols ■ in the drawing), and additionally the scan angle can be increased by approximately 20% (see the symbol ● in the drawing). Thus, the overall size of the optical scanning device can be reduced.

Figure 12:
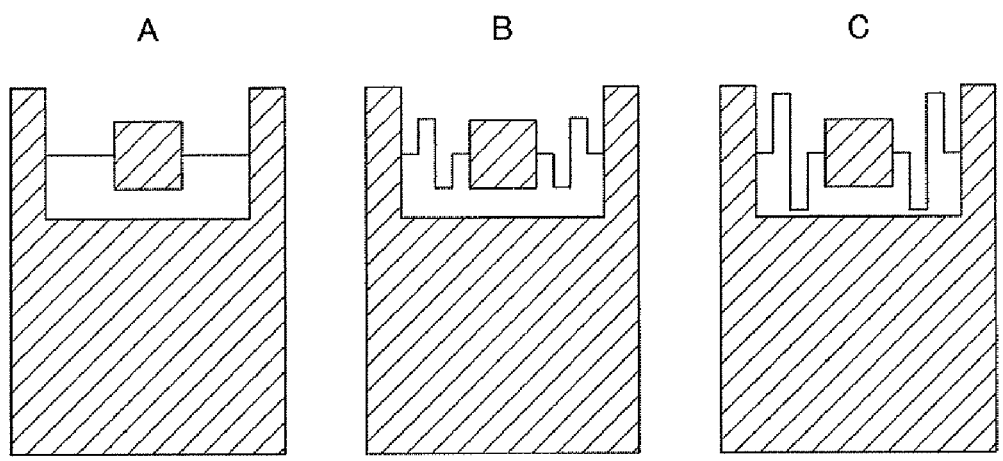
FIG. 12 is a plan view illustrating a modified example of Example 2 according to the invention.
Figure 12:
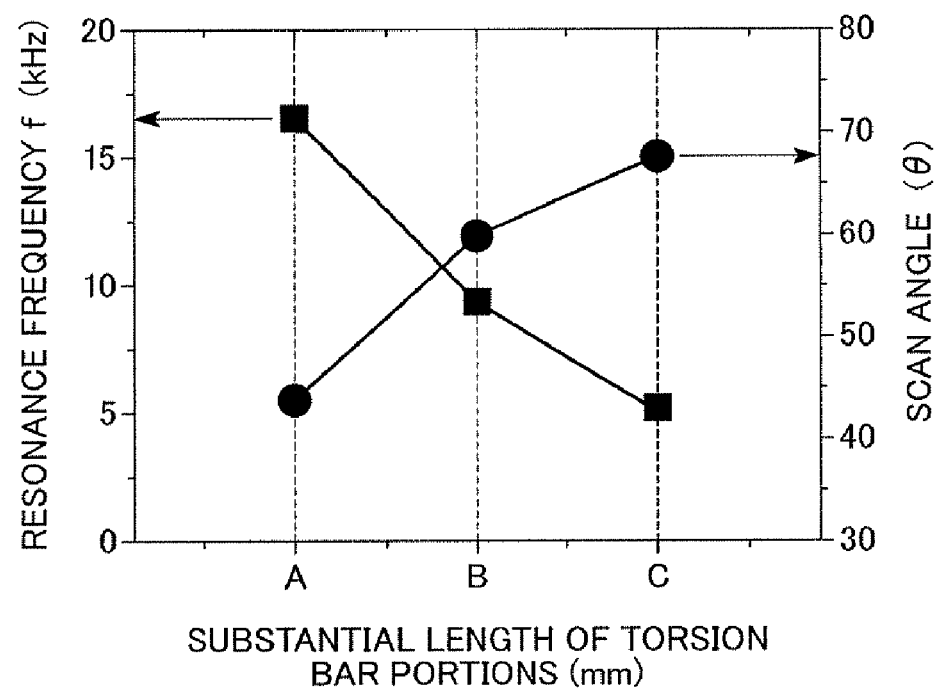

As shown in FIG. 12, if the length of a straight line connecting together the two ends of each torsion bar portion 12 is considered as being fixed at 1 mm, then as a result of the extended length provided by the zig-zag structure, the same tendency can be shown as when the length of the bars is extended. For example, it is possible to lower the resonance frequency and, at the same time, increase the scan angle. In this example, if the length of the straight line connecting together the two ends of each torsion bar portion is considered as being fixed at 1 mm, then the substantial length of the torsion bars in this zig-zag structure is extended from 1 mm (see A in FIG. 12) to 3 mm (see B in FIG. 12) or 4.6 mm (see C in FIG. 12). As a result, the scan angles can be increased by 33% and 51% respectively. Thus, the overall size of the optical scanning device can be reduced.

Moreover, it is also possible while maintaining a high scan angle that is greater than or equal to 40° to precisely adjust the resonance frequency.

Figure 13:
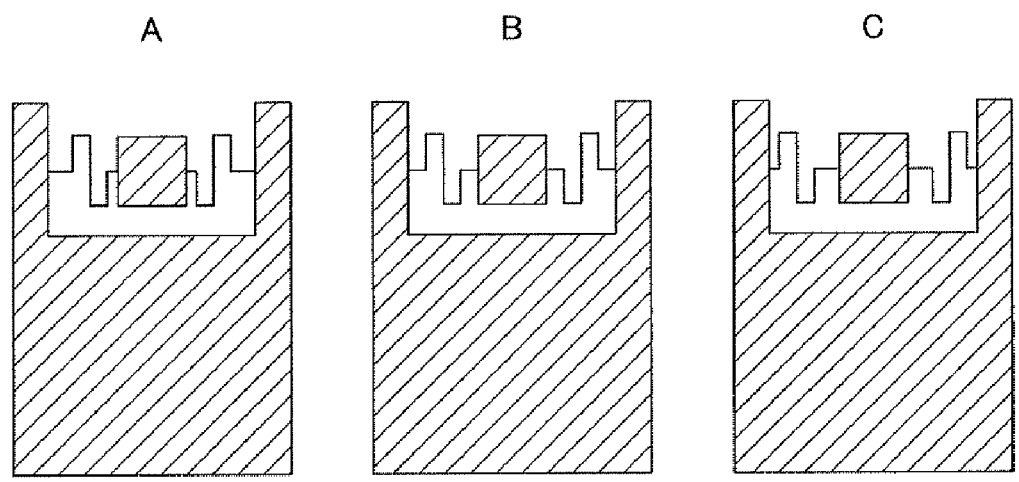
FIG. 13 is a plan view illustrating a modified example of Example 2 according to the invention.
Figure 13:
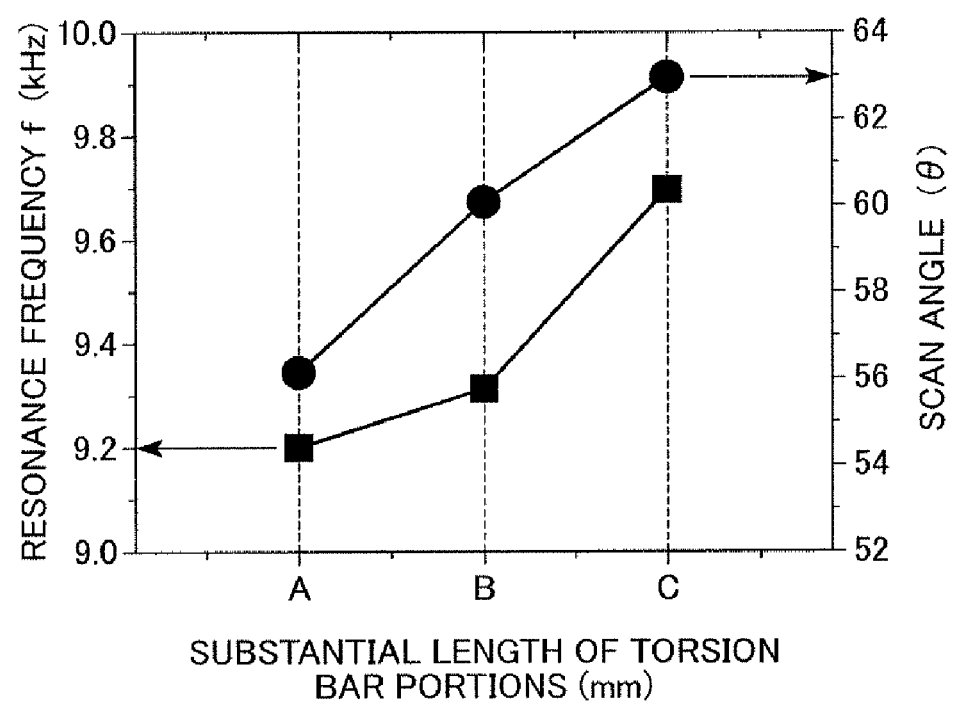

FIG. 13 shows an example in which, by moving the position of the zig-zag structure, the resonance frequency is precisely adjusted up or down.

In this case, with the length of a straight line connecting together the two ends of each torsion bar portion 12 and the substantial length of each torsion bar portion fixed, by moving the position of the zig-zag structure in a center portion of each torsion bar portion away from this center portion towards the cantilever beam portion side, it is possible to lower the resonance frequency and, at the same time, decrease the scan angle. Moreover, by moving the position of the zig-zag structure in the center portion of each torsion bar portion away from this center portion towards the mirror portion 11 side, it is possible to raise the resonance frequency and, at the same time, increase the scan angle. By employing this technique, it is possible while maintaining a high scan angle greater than or equal to 50° to precisely adjust the resonance frequency.

Moreover, at this time, the torsion angle of each portion of the torsion bar portions 12 per unit length of the length of a straight line connecting together the two ends of each torsion bar portion 12 is smaller than when a simple straight rod-shaped torsion bar structure is used, and when the torsion bar portions are made from a metal material, this enables the fatigue characteristics to be improved. Moreover, when a brittle material such as silicon monocrystals is used, it is possible to cause the mirror portion to resonate at a larger scan angle that is greater than or equal to the brittle fracture limit.

EXAMPLE 3

Figure 14:
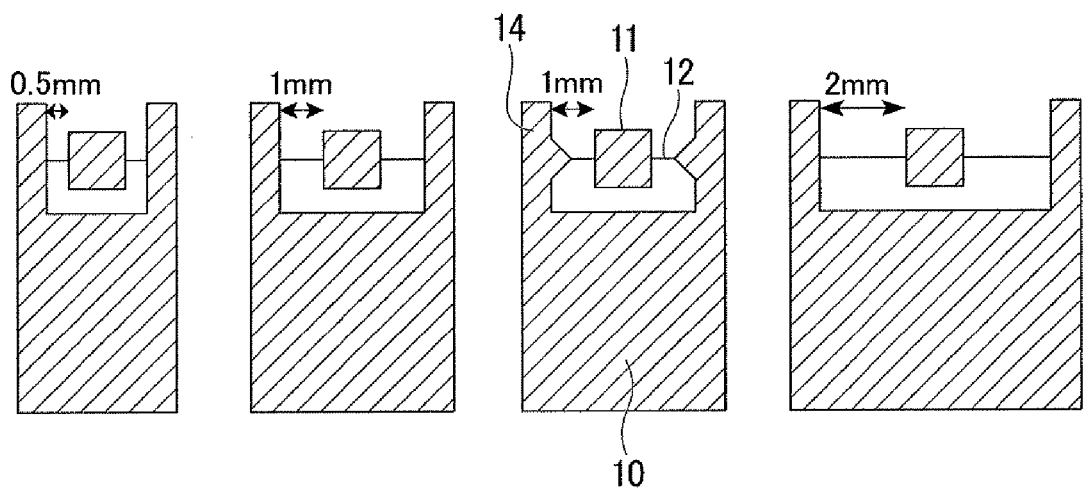
FIG. 14 is a plan view illustrating Example 3 according to the invention.
Figure 14:
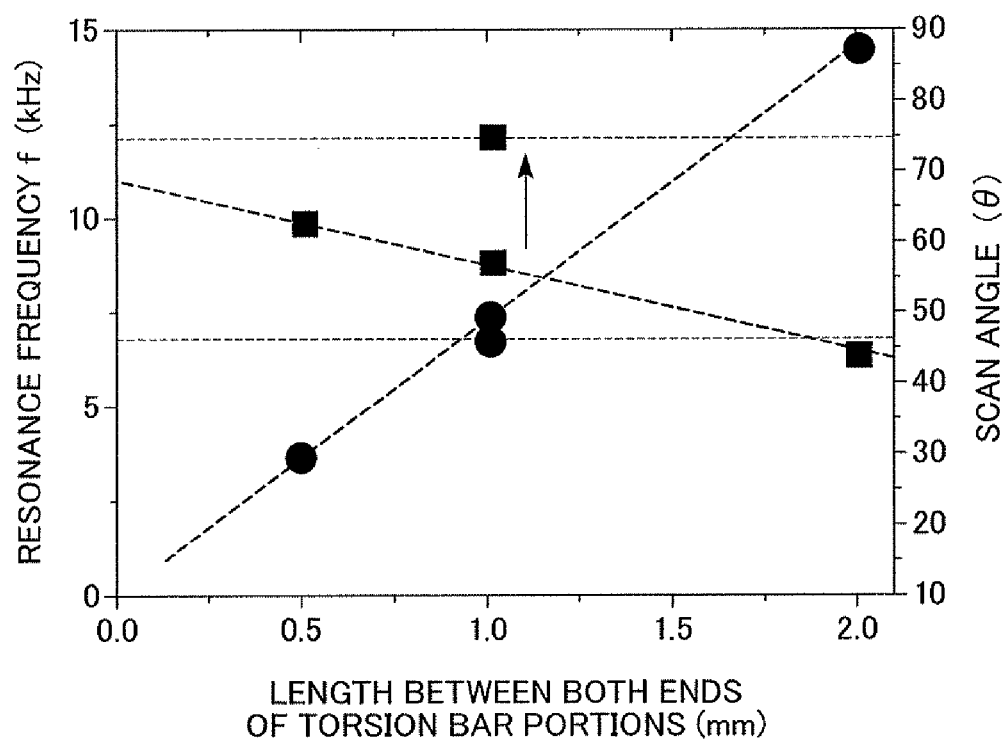

FIG. 14 is a plan view illustrating Example 3 according to the invention. In FIG. 14, a supporting component which supports a substrate 10, an optical scan driving piezoelectric film, and a power supply and the like have been omitted from the drawing.

FIG. 14 shows an example of a method of distributing the above-described spring constant in which, by distributing the spring constant between a portion of the width of the torsion bar portions 12, it is possible to partially increase the mechanical rigidity and, in spite of the overall length of the torsion bar portions 12 remaining fixed, the torsion resonance frequency of the mirror portion 11 is increased.

In the experiment data shown in FIG. 14, the resonance frequency and scan angle data are shown for when the length of straight torsion bar portions 12 having a fixed width was changed in order to provide a comparison. When both were compared, it was confirmed that when the supporting portions of the substrate 10 which support the torsion bar portions 12 were formed in a triangular shape so that the spring constant was distributed over the width of the torsion bar portions 12, while the scan angle was kept substantially constant, the resonance frequency was increased by substantially 30% from, 8.6 kHz to 12 kHz (as shown by the arrow in FIG. 14). In this case, it was found that a high resonance frequency which was impossible to achieve even when the length of the torsion bar portions 12 was shortened to the minimum possible limit was able to be achieved by forming the supporting portions of the substrate 10 which support the torsion bar portions 12 in a triangular shape so that the spring constant was distributed over the width of the bars.

Due to the effect of the triangle shape in the supporting portion of the cantilever beam portions 14 which support the torsion bar portions 12, the transmission efficiency of the vibration energy being transmitted from the substrate 10 side is strengthened. As a result, in order for it to be possible to increase the resonance frequency while the scan angle is kept in a substantially unchanged state, it is desirable for the height of the triangle shapes to be less than or equal to half the overall length of the torsion bar portions 12.

EXAMPLE 4

Figure 17:
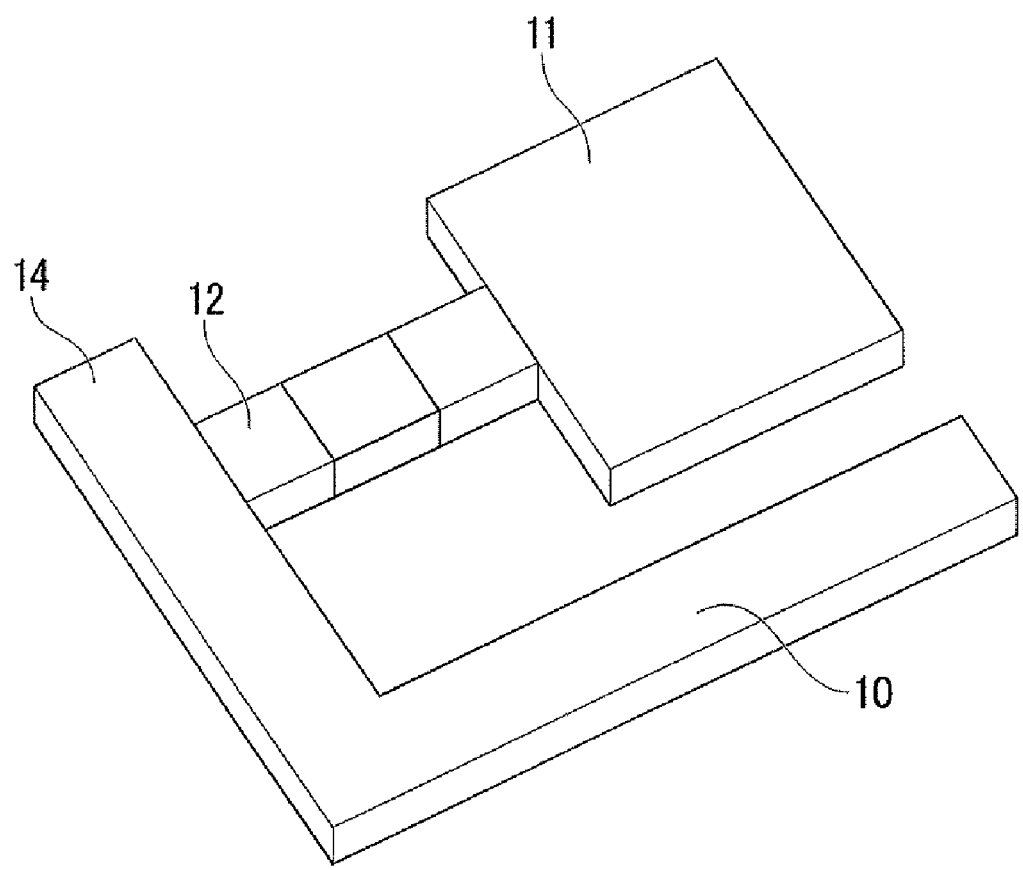
FIG. 17 is a perspective view illustrating Example 4 according to the invention.

FIG. 17 is a perspective view illustrating Example 4 according to the invention. FIG. 17 shows an example of the distribution of the spring constant over the longitudinal direction of the torsion bar portions 12. In this example, by changing the material of the torsion bar portions 12 in the longitudinal direction supporting the mirror portion 11, the resonance frequency or scan angle are changed.

By raising the mechanical rigidity in the longitudinal direction by a factor of 0.7 relative to the material forming the substrate 10 of portions of the material forming the torsion bar portions 12, it is possible to increase the resonance frequency thereof while keeping the scan angle substantially constant.

Moreover, by lowering the mechanical rigidity in the longitudinal direction by a factor of 0.8 relative to the material forming the substrate 10 of portions of the material forming the torsion bar portions 12, it is possible to increase the scan angle thereof while keeping the resonance frequency substantially constant.

Figure 18:
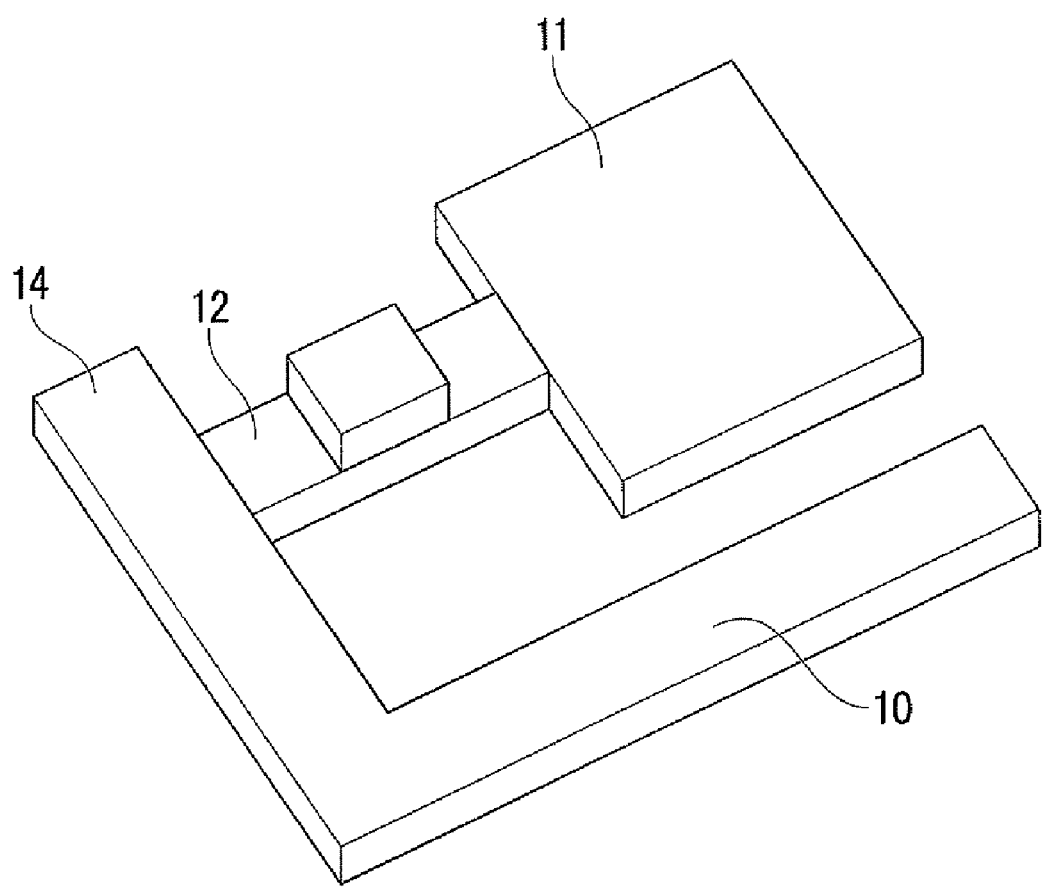
FIG. 18 is a perspective view illustrating a modified example of Example 4 according to the invention.
Figure 19:
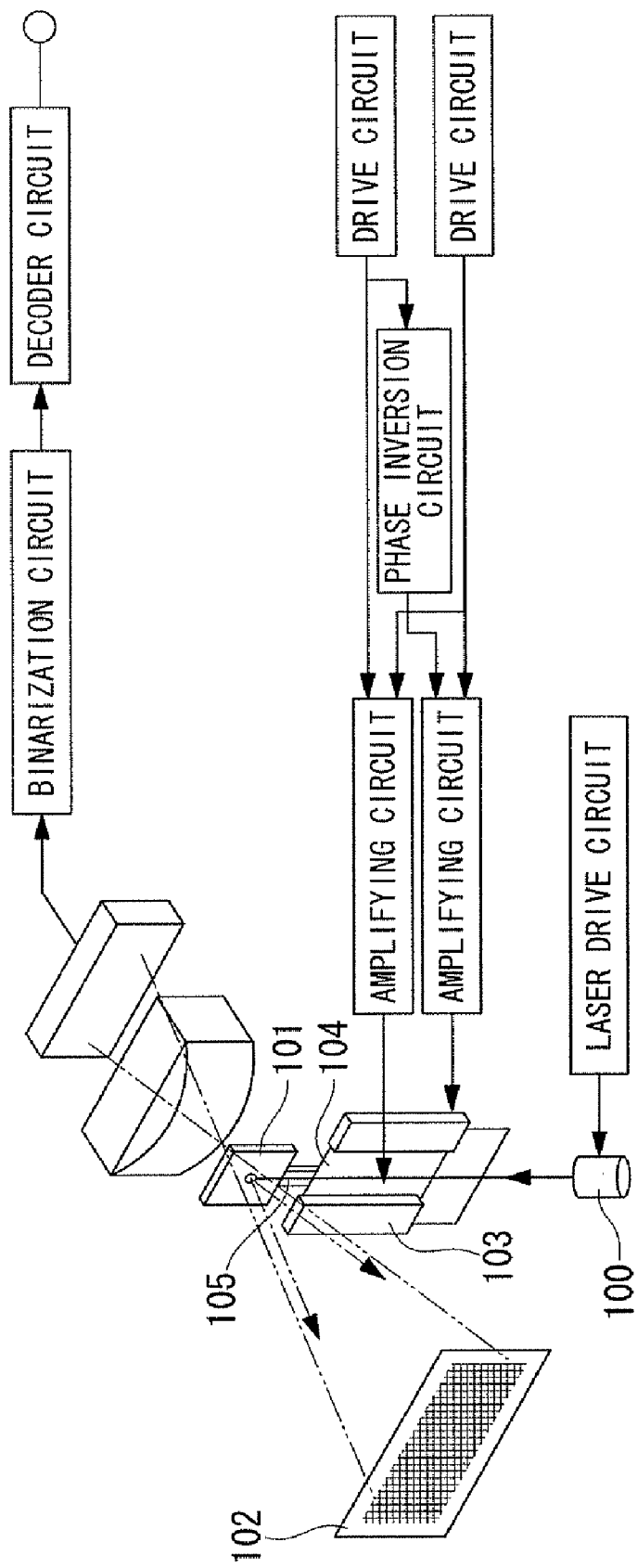
FIG. 19 is a view illustrating Conventional technology 1.
Figure 20:
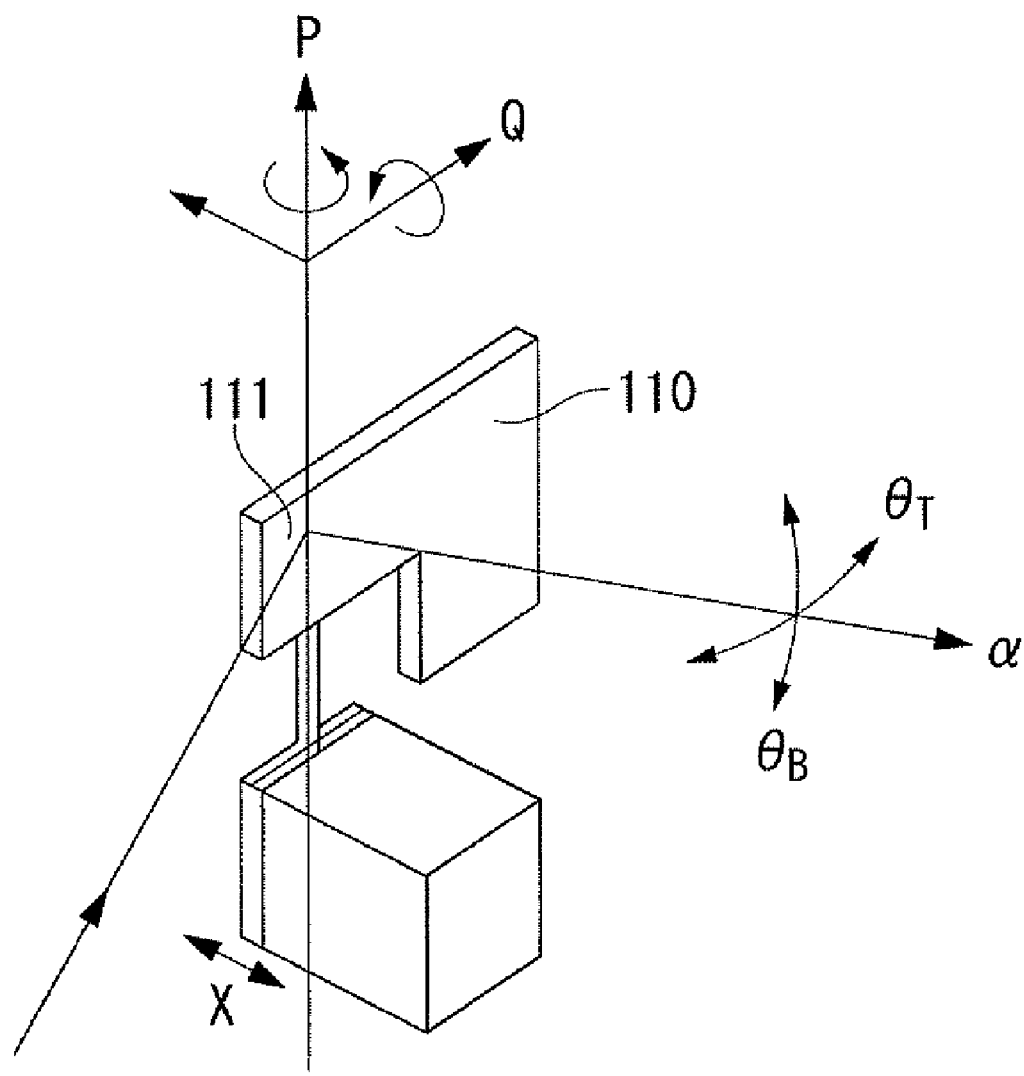
FIG. 20 is a view illustrating Conventional technology 2.
Figure 21:
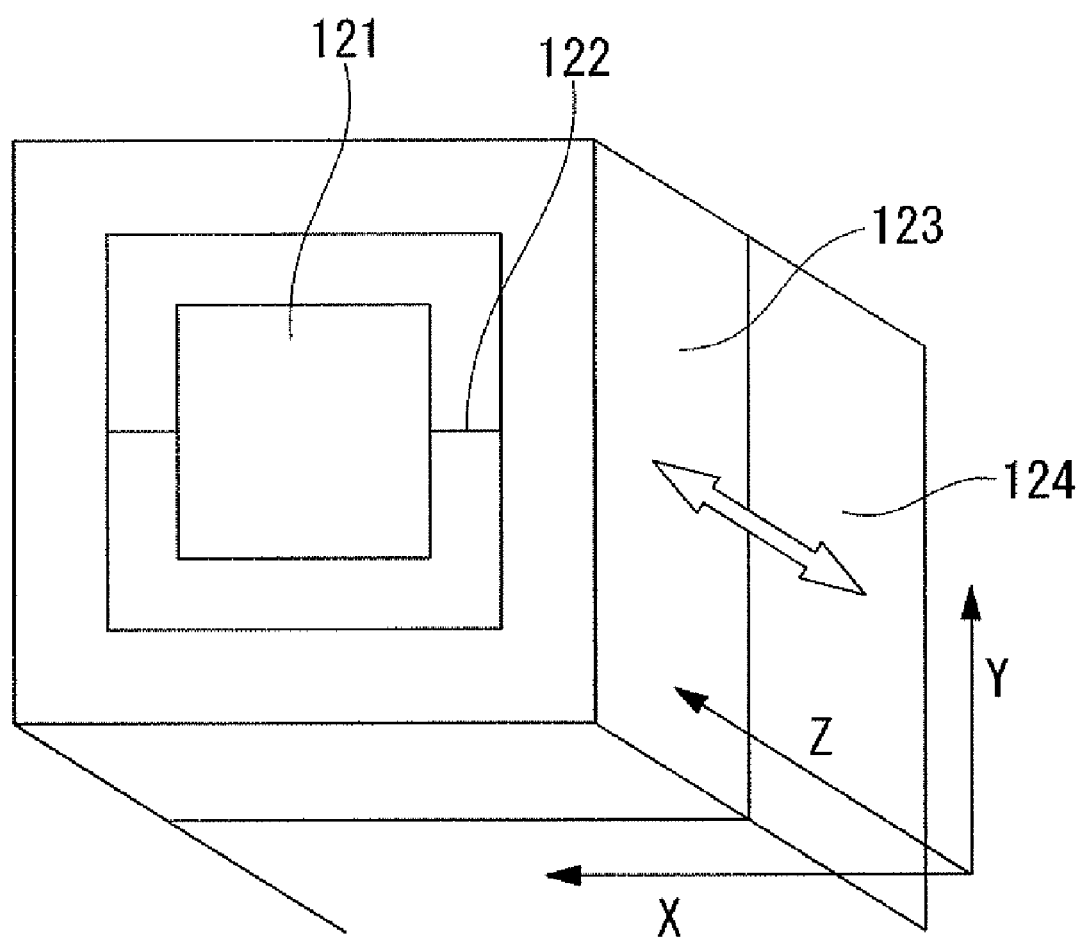
FIG. 21 is a view illustrating Conventional technology 3.
Figure 22:
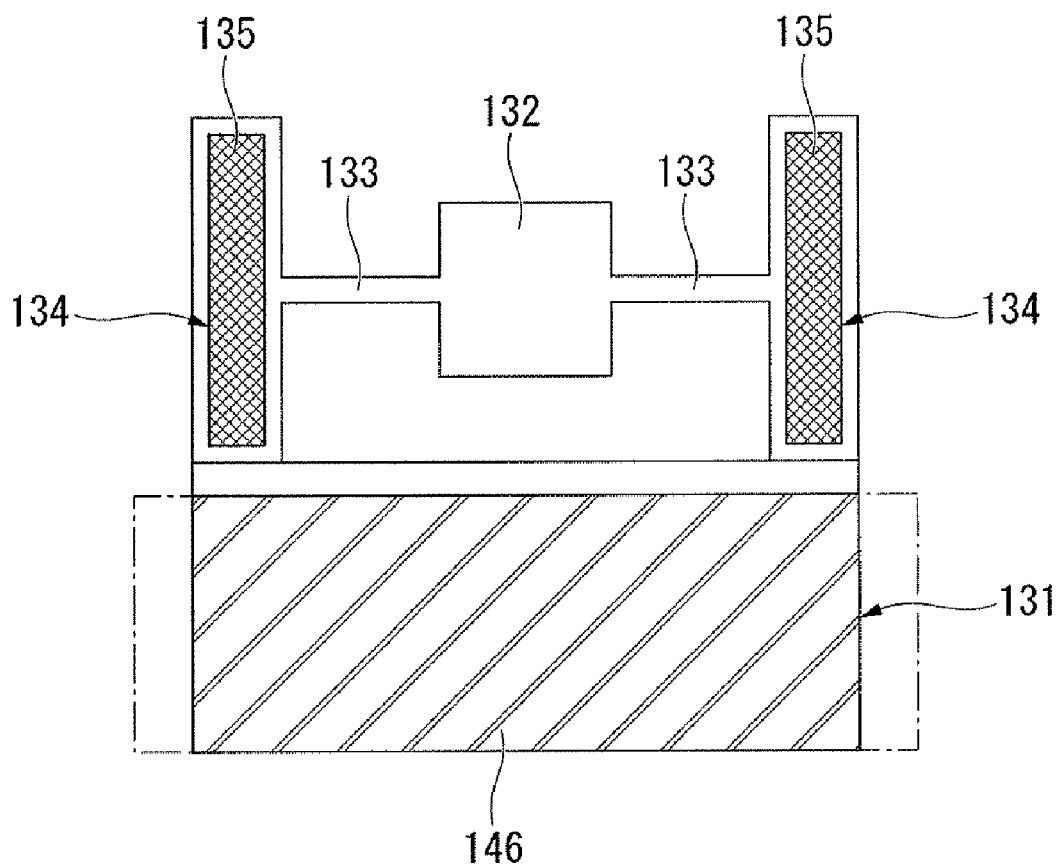
FIG. 22 is a view illustrating Conventional technology 4.
Figure 23:
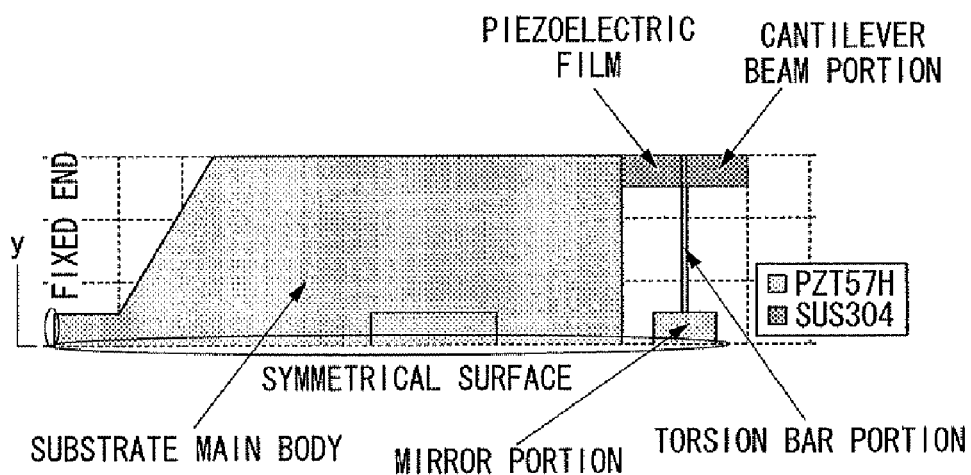
FIG. 23 shows the same type of structure as in the case of Conventional technology 4, with a surface where Y=0 being taken as a plane of symmetry, and with half of this being used as a model.
Figure 24:
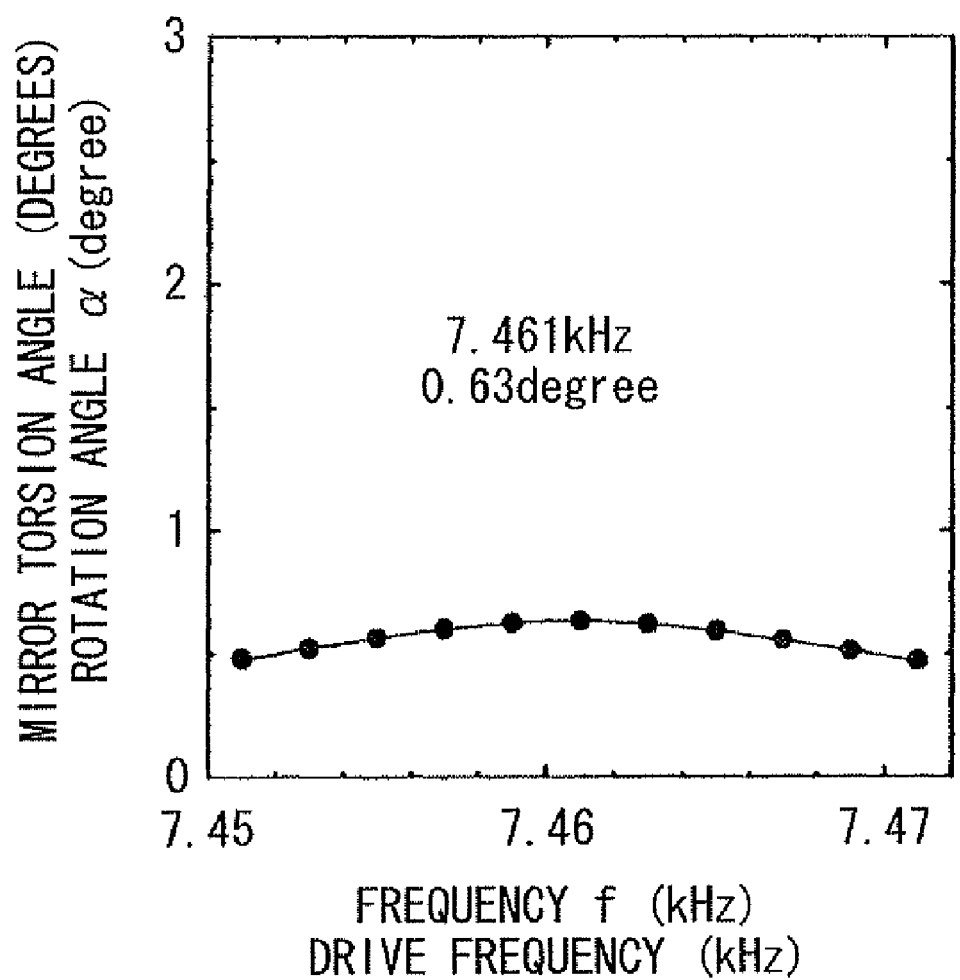
FIG. 24 is a view showing a torsion angle of a mirror portion of a device having the structure shown in FIG. 23.

FIG. 18 is a perspective view illustrating Example 4 according to the invention. FIG. 18 shows an example of the distribution of the spring constant over the longitudinal direction of the torsion bar portions 12. In this example, by providing a different material from the material forming the torsion bar portions 12 integrally with a portion of the torsion bar portions 12 supporting the mirror portion 11, the resonance frequency or scan angle are changed.

By providing as the material which is different from the material forming the torsion bar portions 12 a material having a higher mechanical rigidity (e.g., TiN, W, Al2O3) than the material forming the torsion bar portions 12 integrally with a portion of the torsion bar portions 12 supporting the mirror portion 11, it is possible to increase the scan angle thereof while keeping the resonance frequency substantially constant. In particular, by adjusting the thickness of the material having a high mechanical rigidity, it is possible to precisely adjust any desired increase in the resonance frequency. Moreover, by adjusting the position on the portion of the torsion bar portions 12 where the material which is different from the material forming the torsion bar portions 12 is located as well as by adjusting the size thereof, it is possible to precisely adjust the resonance frequency.

The material which is different from the material forming the torsion bar portions 12 which is formed on the torsion bar portions 12 is desirably a thick film formed by an AD method.

EXAMPLE 5

Shot peening is a cold working technique in which small, hard spheres having a particle diameter of approximately 20 μm to 1.3 mm which are known as shot material are jetted at an accelerating speed by a projection apparatus so as to collide at high speed with a processing component. Torsion bar portions 12 which have been subjected to the shot peening have a certain amount of roughness formed on the surface thereof, however, the surface layer portion thereof becomes work-hardened, and has a high level of compressive residual stress imparted thereto. As a result, the mechanical rigidity is increased in portions of the torsion bar portions 12 so that it is possible to increase the resonance frequency thereof while keeping the scan angle substantially constant. Moreover, by adjusting the material used for the shot peening material as well as the position and size of the area where the shot peening is performed, it is possible to precisely adjust the resonance frequency.

EXAMPLE 6

Figure 4:
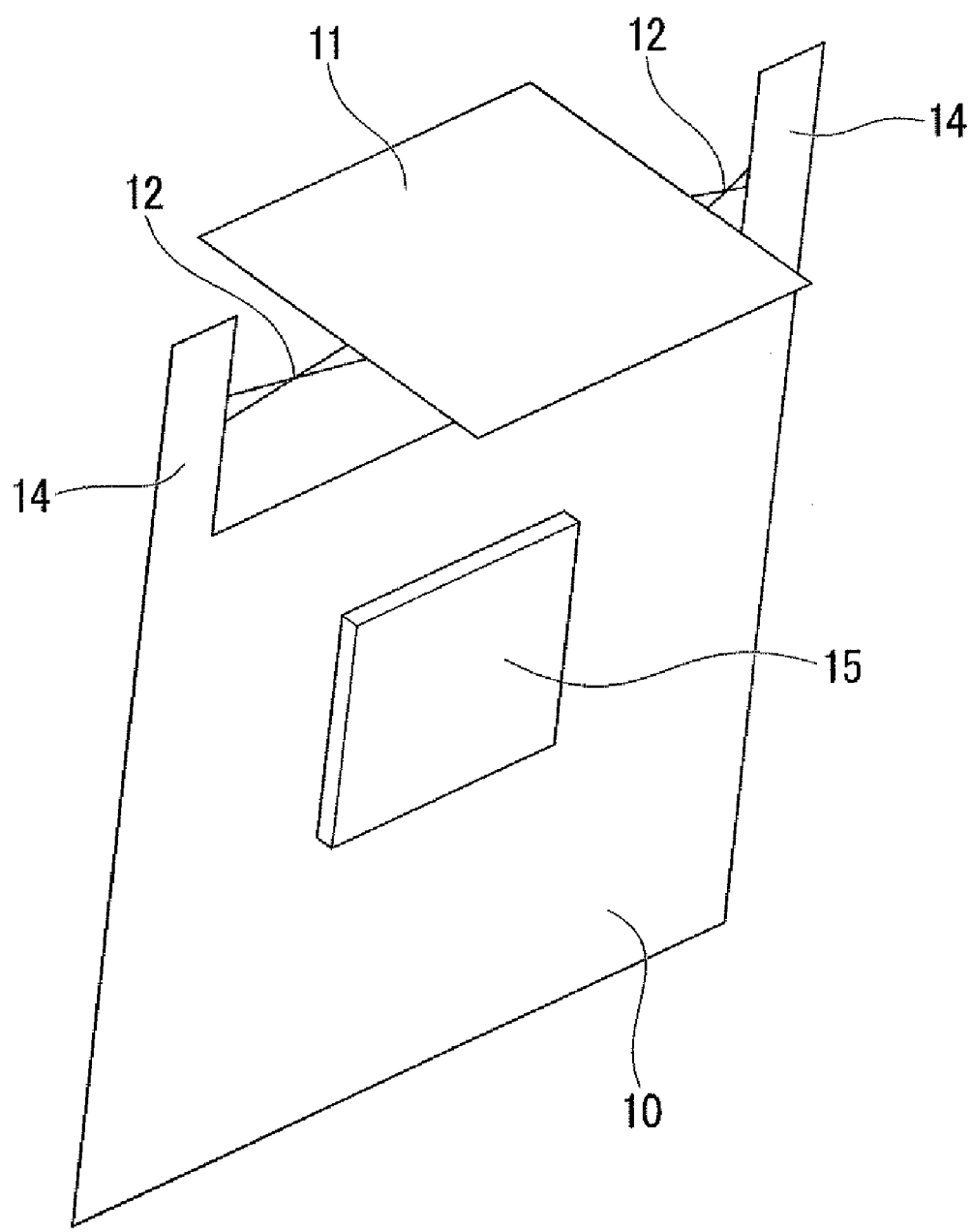
FIG. 4 is a perspective view illustrating Example 6 according to the invention, and shows a state in which the torsion bar portions which support the mirror portion being plastically deformed, and the mirror portion being fixed in position on an angle relative to the substrate supporting the torsion bar portions.
Figure 5:
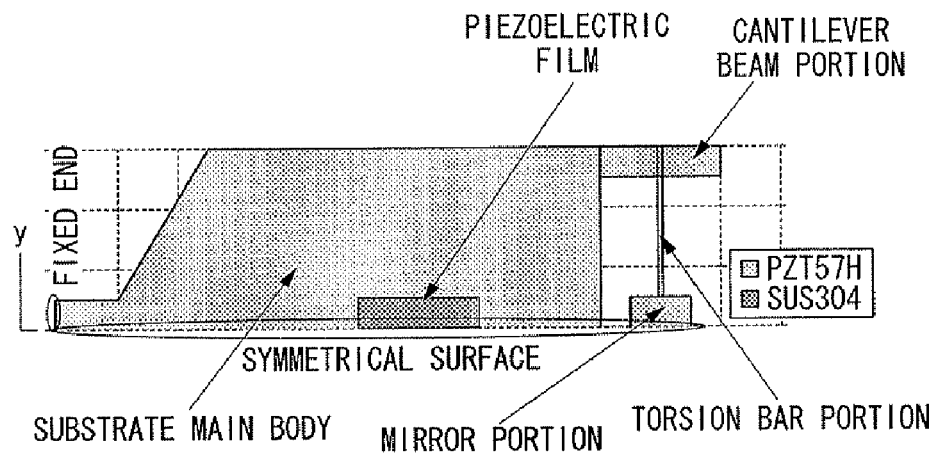
FIG. 5 is a plan view of an optical scanning apparatus of the invention which has a structure in which a single piezoelectric film is formed on a substrate main body, with a surface where Y=0 being taken as a plane of symmetry, and with half of this being used as a model.
Figure 6:
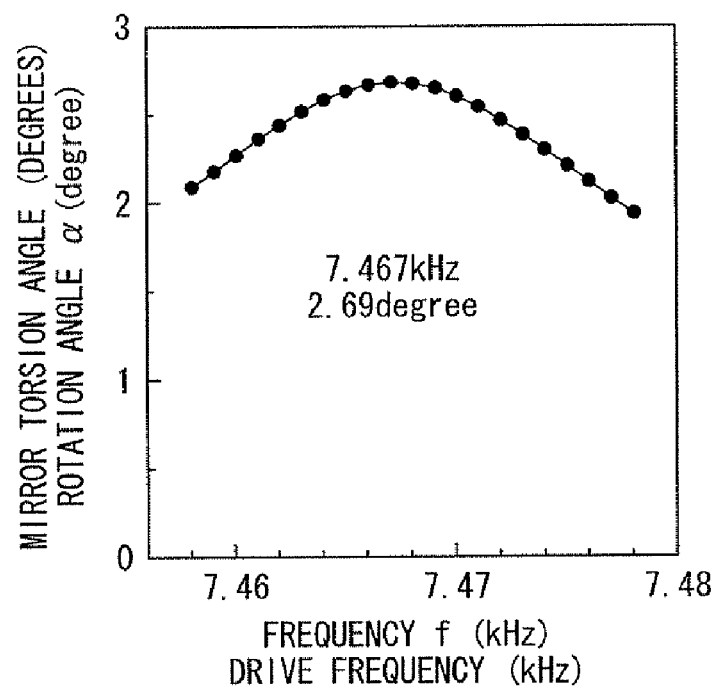
FIG. 6 is a view showing a torsion angle of a mirror portion of the device shown in FIG. 5.
Figure 7:
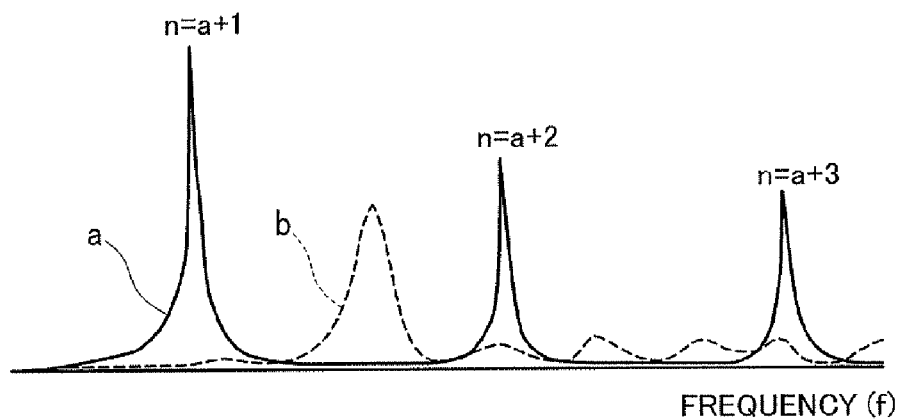
FIG. 7 is a view showing resonance frequencies of the substrate and mirror portion of the optical scanning device according to the invention.
Figure 8:
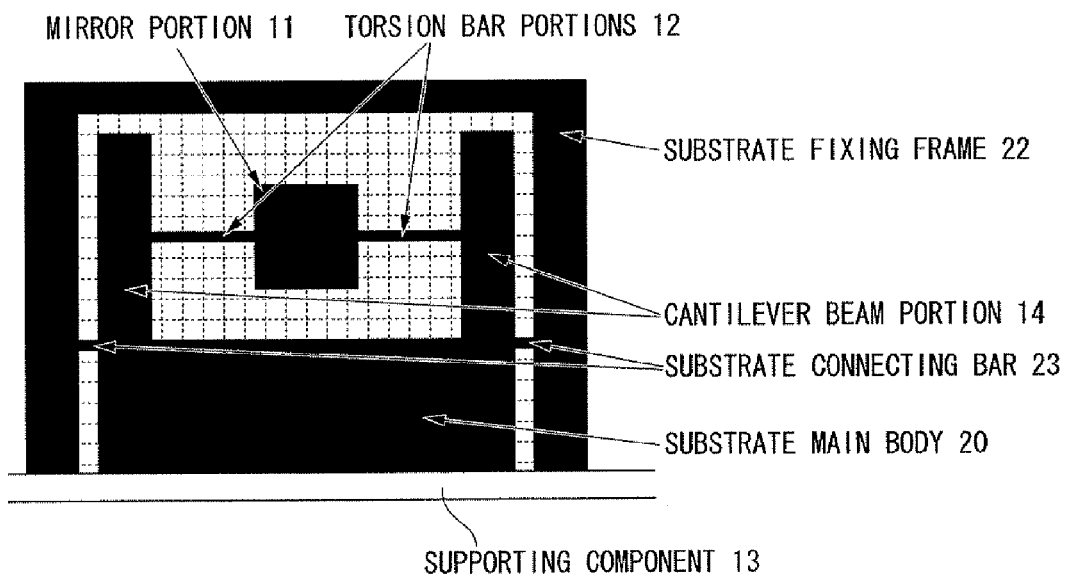
FIG. 8 is a plan view of a device in which a substrate fixing frame has been positioned so as to surround the substrate main body and cantilever beam portions according to the invention.
Figure 9:
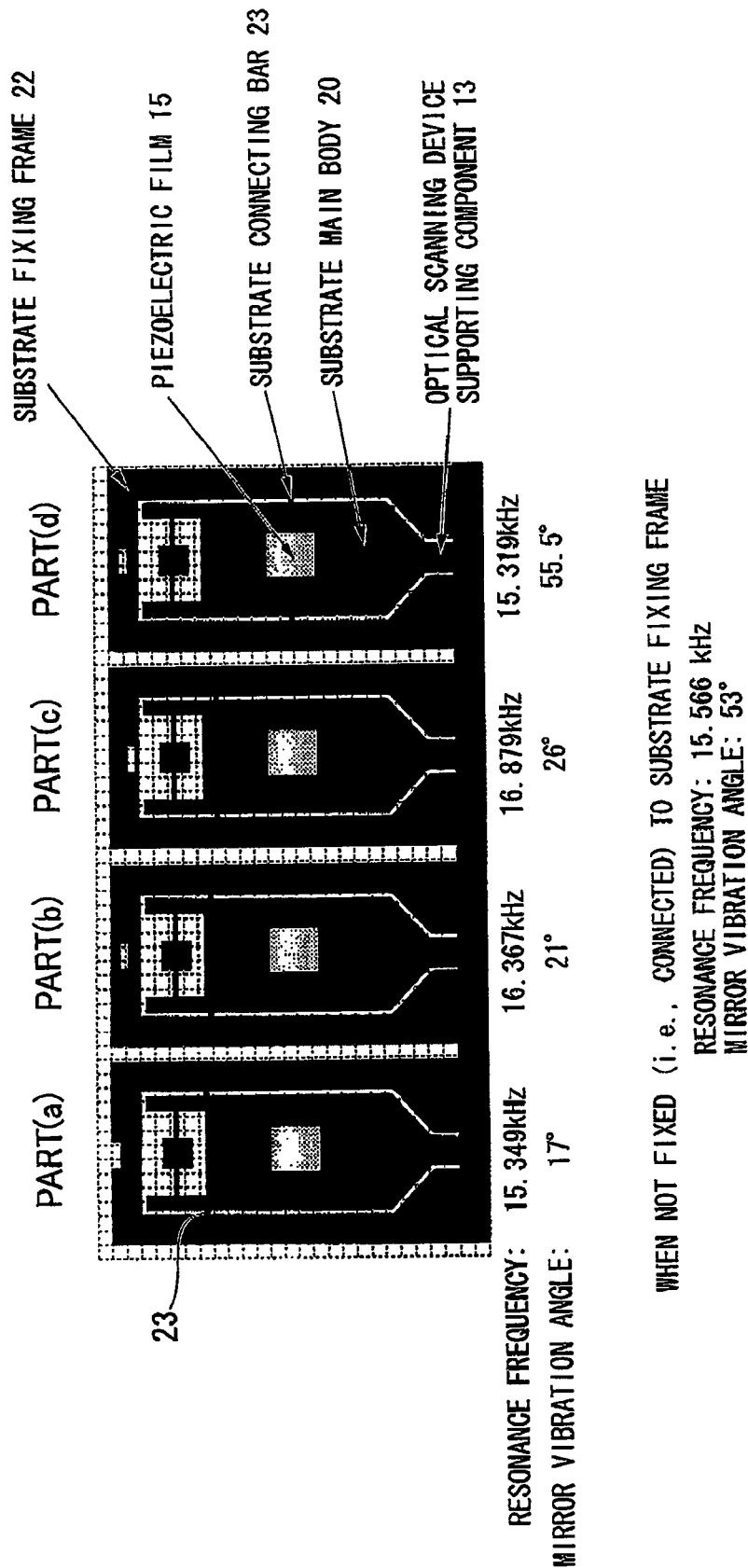
FIG. 9 is a view illustrating mirror torsion angles when the position of substrate connecting bars which connect together a substrate and a substrate fixing frame is changed.
Figure 10:
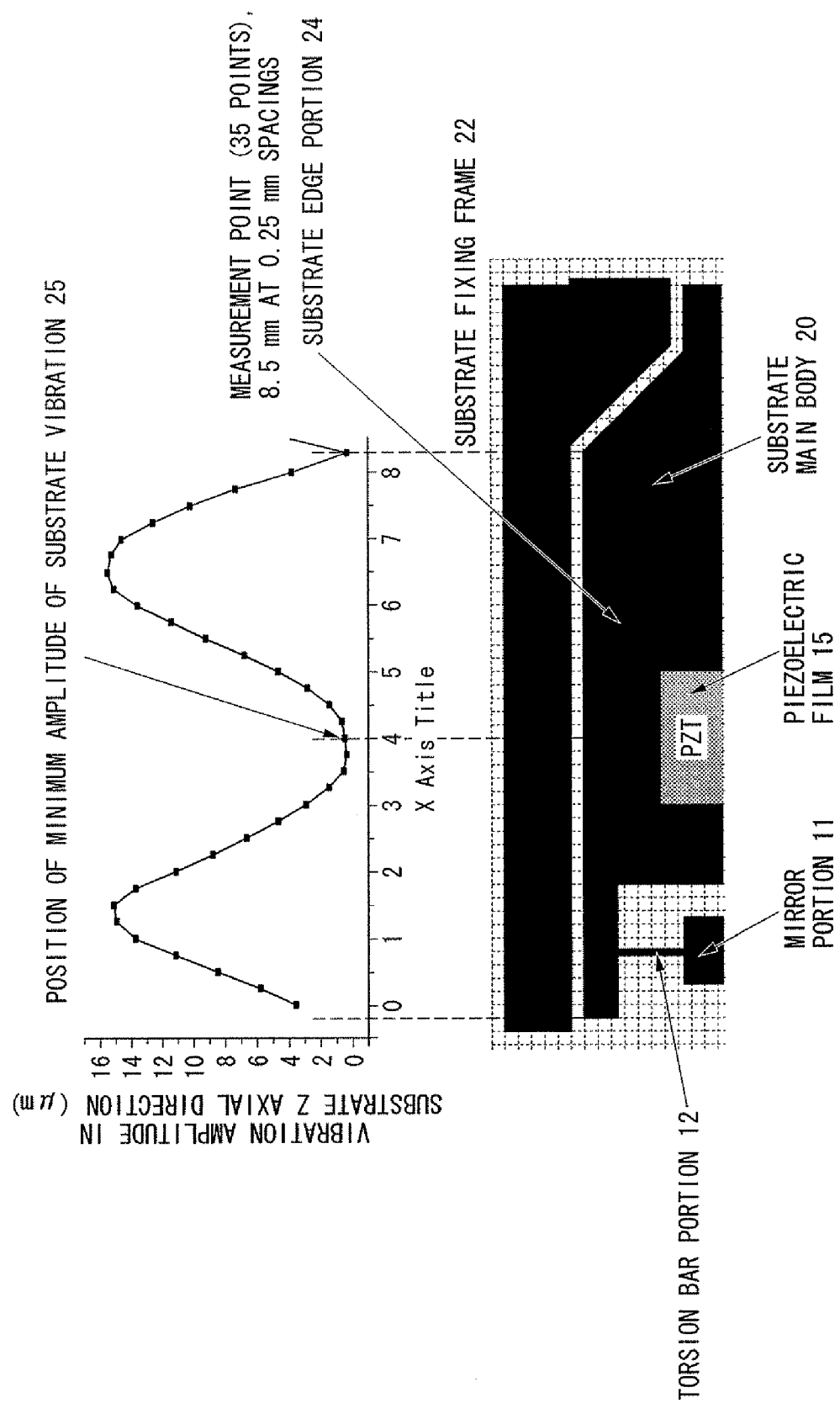
FIG. 10 is an explanatory view illustrating a state of the resonance amplitude of an edge portion of a substrate when the mirror portion is in torsional resonance state when the substrate and the substrate fixing frame are not connected by substrate connecting bars.

FIG. 4 is perspective view illustrating Example 6 according to the invention. In this example, the torsion bar portions 12 which support the mirror portion 11 are formed from a metal material such as stainless steel or from a plastically deformable material such as a resin material. By causing these torsion bar portions 12 to become plastically deformed so that the mirror portion 11 is fixed on an angle relative to the substrate 10 supporting the torsion bar portions 12, then an optical beam is incident onto the mirror portion 11 without using reflective mirrors, it is possible to impart a deflection angle to the scanning optical beam. In experiments it was confirmed that, as shown in FIG. 4, as a result of the plastic deformation of metal torsion bar portions, even if the deflection angle of the mirror portion 11 relative to the substrate 10 is changed from 0° to 90°, a state of resonance could still be achieved.

Figure 15:
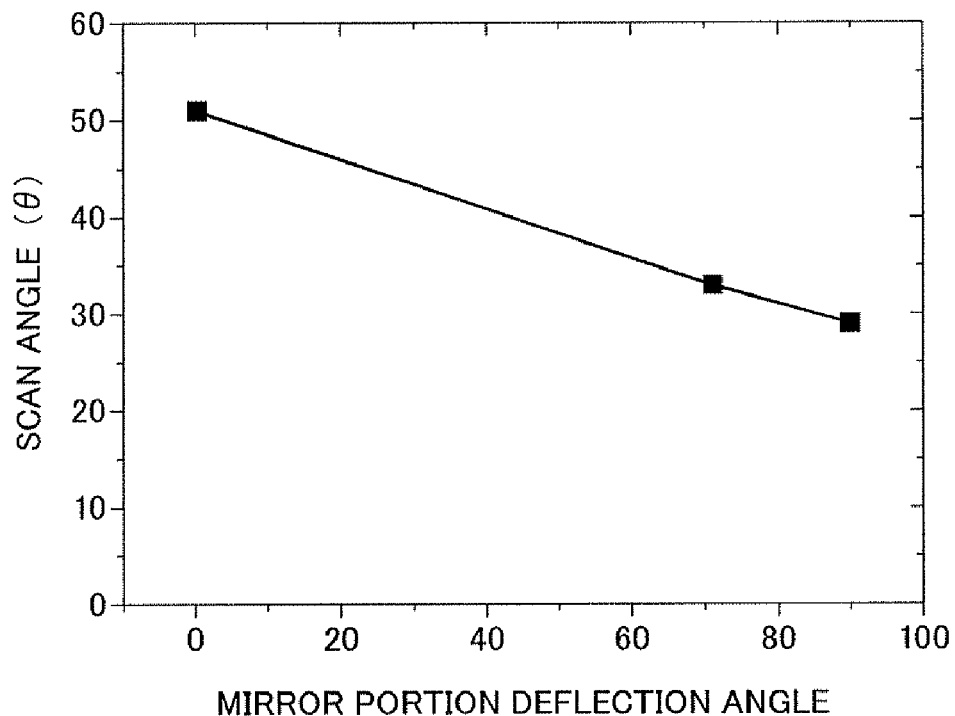
FIG. 15 is a view showing a relationship between an increase in the deflection angle caused by twisting of the torsion bar portions and the scan angle of the mirror portion.
Figure 16:
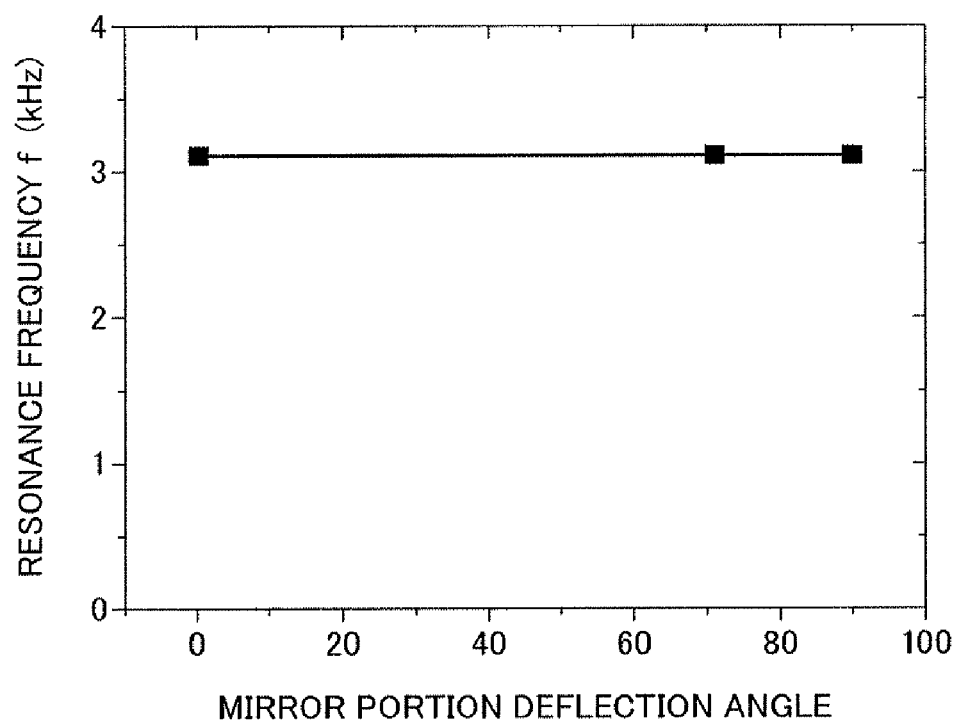
FIG. 16 is a view showing a relationship between an increase in the deflection angle caused by twisting of the torsion bar portions and the torsion resonance frequency.

Moreover, as shown in FIGS. 15 and 16, the increase in the deflection angle caused by twisting of the torsion bar portions 12 has substantially no effect on the torsion resonance frequency of the mirror portion 11, however, the scan angle decreases in conjunction with the increase in the deflection angle.

What is claimed is:

1. An optical scanning device, comprising:
    a substrate;
    torsion bar portion which is connected to the substrate;
    a mirror portion which is supported by the torsion bar portion;
    a drive source which causes the mirror portion to oscillate; and
    a light-source which projects light onto the mirror portion, wherein
    the mirror portion resonates and vibrates in accordance with a vibration imparted to the substrate by the drive source, and the direction of reflection light from the light projected onto the mirror portion from the light source changes in accordance with the vibration of the mirror portion, wherein
    the mirror portion is set in a desired position by pivoting the mirror portion from an initial set position of the mirror portion around the supporting axis of the torsion bar portion, and imparting plastic deformation to the torsion bar portion, and wherein
    a substrate fixing frame is positioned so as to surround a substrate main body and cantilever beam portions and is fixed to a fixing end portion side of the substrate main body, and the substrate main body and the substrate fixing frame are connected together by substrate connecting bars at a position separated from a supporting component, and
    the substrate main body and the substrate fixing frame are also connected together by substrate connecting bars in the vicinity of the minimum amplitude of the substrate vibration.

2. The optical scanning device according to claim 1, wherein,
    a resonance frequency of the mirror portion which is determined by the weight of the mirror portion and the spring constant of the torsion bar portion is set away from the resonance frequency of the substrate.

3. An optical scanning device, comprising:
    a substrate;
    torsion bar portion which is connected to the substrate;
    a mirror portion which is supported by the torsion bar portion;
    a drive source which causes the mirror portion to oscillate; and
    a light-source which projects light onto the mirror portion, wherein
    the mirror portion resonates and vibrates in accordance with a vibration imparted to the substrate by the drive source, and the direction of reflection light from the light projected onto the mirror portion from the light source changes in accordance with the vibration of the mirror portion, wherein
    the mirror portion is set in a desired position by pivoting the mirror portion from an initial set position of the mirror portion around the supporting axis of the torsion bar portion, and imparting plastic deformation to the torsion bar portion, and
    wherein a resonance frequency of the mirror portion which is determined by the weight of the mirror portion and the spring constant of the torsion bar portion is set away from the resonance frequency of the substrate.

* * * * *

UNITED STATES PATENT AND TRADEMARK OFFICE
CERTIFICATE OF CORRECTION

PATENT NO. : 8,411,343 B2
APPLICATION NO. : 12/443023
DATED : April 2, 2013
INVENTOR(S) : Akedo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this

First Day of September, 2015

Michelle K. Lee
*Director of the United States Patent and Trademark Office*